US009285794B2

(12) United States Patent
Wang et al.

(10) Patent No.: US 9,285,794 B2
(45) Date of Patent: Mar. 15, 2016

(54) DRILLING ADVISORY SYSTEMS AND METHODS WITH DECISION TREES FOR LEARNING AND APPLICATION MODES

(75) Inventors: Lei Wang, The Woodlands, TX (US); Stephen M. Remmert, Crossville, TN (US); Paul E. Pastusek, The Woodlands, TX (US); Jeffrey R. Bailey, Houston, TX (US); Matthew T. Prim, Houston, TX (US); Dar-Lon Chang, Sugar Land, TX (US); Gregory S. Payette, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 742 days.

(21) Appl. No.: 13/605,467

(22) Filed: Sep. 6, 2012

(65) Prior Publication Data

US 2013/0066471 A1 Mar. 14, 2013

Related U.S. Application Data

(60) Provisional application No. 61/531,926, filed on Sep. 7, 2011.

(51) Int. Cl.
  *G05B 19/04* (2006.01)
  *G05B 13/00* (2006.01)
  *E21B 44/00* (2006.01)
  *G05B 13/02* (2006.01)

(52) U.S. Cl.
  CPC ............ *G05B 19/0405* (2013.01); *E21B 44/00* (2013.01); *G05B 13/00* (2013.01); *G05B 13/024* (2013.01)

(58) Field of Classification Search
  CPC .. G05B 13/00; G05B 13/024; G05B 19/0405; G01V 1/40; E21B 44/00; E21B 45/00
  See application file for complete search history.

(56) References Cited

U.S. PATENT DOCUMENTS

| 4,507,735 A | 3/1985 | Moorehead et al. |
| 4,736,297 A | 4/1988 | LeJeune |

(Continued)

FOREIGN PATENT DOCUMENTS

| WO | WO 2011/016928 A1 | 2/2011 |
| WO | WO 2011016927 A1 * | 2/2011 |

(Continued)

OTHER PUBLICATIONS

Zheng et al., "An Integrated Global and Local Optimization Approach for Remediation System Design," Water Resources Research, vol. 35, No. 1, pp. 137-148, Jan. 1999.*

(Continued)

*Primary Examiner* — M. N. Von Buhr
(74) *Attorney, Agent, or Firm* — ExxonMobil Upstream Research-Law Department

(57) ABSTRACT

Integrated methods and systems for optimizing drilling related operations include global search engines and local search engines to find an optimal value for at least one controllable drilling parameter, and decision trees to select algorithms such as between learning mode algorithms and application mode algorithms for generating operational recommendations based on the results from global and local search engines. The operational recommendations are used to optimize the objective function, mitigate dysfunctions, and improve drilling efficiency.

19 Claims, 12 Drawing Sheets

(56) References Cited

U.S. PATENT DOCUMENTS

| | | | |
|---|---|---|---|
| 5,216,917 | A | 6/1993 | Detournay |
| 5,415,030 | A | 5/1995 | Jogi et al. |
| 5,551,286 | A | 9/1996 | Booer |
| 5,663,929 | A | 9/1997 | Pavone et al. |
| 5,730,234 | A | 3/1998 | Putot |
| 5,842,149 | A | 11/1998 | Harrell et al. |
| 6,021,377 | A | 2/2000 | Dubinsky et al. |
| 6,026,912 | A | 2/2000 | King et al. |
| 6,155,357 | A | 12/2000 | King et al. |
| 6,192,998 | B1 | 2/2001 | Pinckard |
| 6,276,465 | B1 | 8/2001 | Cooley et al. |
| 6,293,356 | B1 * | 9/2001 | King et al. ............... 175/27 |
| 6,382,331 | B1 | 5/2002 | Pinckard |
| 6,408,953 | B1 | 6/2002 | Goldman et al. |
| 6,424,919 | B1 | 7/2002 | Moran et al. |
| 6,443,242 | B1 | 9/2002 | Newman et al. |
| 6,480,118 | B1 | 11/2002 | Rao |
| 6,662,110 | B1 | 12/2003 | Bargach et al. |
| 6,732,052 | B2 | 5/2004 | Macdonald et al. |
| 6,820,702 | B2 | 11/2004 | Niedermayr et al. |
| 6,892,812 | B2 | 5/2005 | Niedermayr et al. |
| 6,968,909 | B2 | 11/2005 | Aldred et al. |
| 7,020,597 | B2 | 3/2006 | Oliver et al. |
| 7,044,238 | B2 | 5/2006 | Hutchinson |
| 7,044,239 | B2 | 5/2006 | Pinckard et al. |
| 7,142,986 | B2 | 11/2006 | Moran |
| 7,172,037 | B2 | 2/2007 | Dashevskiy et al. |
| 7,261,167 | B2 | 8/2007 | Goldman et al. |
| 7,274,990 | B2 | 9/2007 | Mathiszik et al. |
| 7,316,278 | B2 | 1/2008 | Hutchinson |
| 7,357,196 | B2 | 4/2008 | Goldman et al. |
| 7,363,988 | B2 | 4/2008 | Jeffryes |
| 7,412,331 | B2 | 8/2008 | Calhoun et al. |
| 7,606,666 | B2 | 10/2009 | Repin et al. |
| 7,610,251 | B2 | 10/2009 | Shayegi et al. |
| 7,818,128 | B2 | 10/2010 | Zhou et al. |
| 7,857,047 | B2 | 12/2010 | Remmert et al. |
| 7,878,268 | B2 | 2/2011 | Chapman et al. |
| 7,891,420 | B2 | 2/2011 | Dale et al. |
| 7,896,105 | B2 | 3/2011 | Dupriest |
| 8,014,987 | B2 | 9/2011 | Pabon et al. |
| 2002/0104685 | A1 | 8/2002 | Pinckard et al. |
| 2002/0183987 | A1 * | 12/2002 | Chiang ...................... 703/2 |
| 2004/0256152 | A1 * | 12/2004 | Dashevskiy et al. ......... 175/25 |
| 2005/0096847 | A1 | 5/2005 | Huang |
| 2005/0197777 | A1 | 9/2005 | Rodney et al. |
| 2007/0208677 | A1 * | 9/2007 | Goldberg et al. ............ 706/13 |
| 2008/0077558 | A1 * | 3/2008 | Lawrence et al. .......... 707/3 |
| 2009/0076873 | A1 | 3/2009 | Johnson et al. |
| 2009/0089227 | A1 | 4/2009 | Sturrock et al. |
| 2009/0090555 | A1 | 4/2009 | Boone et al. |
| 2009/0132458 | A1 | 5/2009 | Edwards et al. |
| 2009/0228846 | A1 * | 9/2009 | McConaghy et al. ............ 716/4 |
| 2009/0259406 | A1 * | 10/2009 | Khadhraoui et al. ........... 702/14 |
| 2010/0108384 | A1 | 5/2010 | Byreddy et al. |
| 2011/0232966 | A1 | 9/2011 | Kyllingstad |
| 2011/0295825 | A1 * | 12/2011 | Davar et al. .................... 707/706 |
| 2012/0118637 | A1 | 5/2012 | Wang et al. |
| 2012/0123756 | A1 | 5/2012 | Wang et al. |
| 2012/0123757 | A1 | 5/2012 | Ertas et al. |
| 2012/0143575 | A1 * | 6/2012 | Imhof et al. ....................... 703/2 |
| 2013/0024170 | A1 * | 1/2013 | Dannecker et al. ............... 703/2 |
| 2013/0066445 | A1 * | 3/2013 | Wang et al. ..................... 700/28 |
| 2014/0277752 | A1 * | 9/2014 | Chang et al. .................. 700/275 |
| 2015/0081222 | A1 * | 3/2015 | Laing et al. ...................... 702/9 |

FOREIGN PATENT DOCUMENTS

| | | | |
|---|---|---|---|
| WO | WO 2011017626 | A1 * | 2/2011 |
| WO | WO 2011017627 | A1 * | 2/2011 |
| WO | WO 2013036357 | A1 * | 3/2013 |

OTHER PUBLICATIONS

Goldberg et al., "Optimizing Global-Local Search Hybrids," IlliGAL Report No. 99001, Dept. of General Engineering, University of Illinois at Urbana-Champaign, 14 pgs., Jan. 1999.*

Rappold, K., "Drilling Optimized with Surface Measurement of Downhole Vibrations," Oil and Gas Journal, Feb. 16, 1993.*

Cheatham, C.A. et al. (1990), "Bit Balling in Water-Reactive Shale During Full-Scale Drilling Rate Tests," SPE 19926, 1990 IADC/SPE Drilling Conf., Houston, TX, Feb. 27-Mar. 2, 1990, pp. 169-178.

Gouda, G. M. et al. (2011), "A Real Mathematical Model to Compute the PDC Cutter Wear Value to Terminate PDC Bit Run," SPE 140151, SPE Middle East Oil & Gas Show & Conf., Manama, Bahrain, Sep. 25-28, 2011, 21 pgs.

Ipek, G. et al. (2006), "Diagnosis of Ineffective Drilling Using Cation Exchange Capacity of Shaly Formations," *Journal of Canadian Petroleum Technology* 45(6), pp. 26-30.

Tucker, R.W. et al. (2000), "An Integrated Model for Drill-String Dynamics," Department of Physics, Lancaster University, pp. 1-7, 32-33, 58-64.

Wang, X. et al. (2005), "Process Monitoring Approach Using Fast Moving Window PCA," *Ind. Eng. Chem. Res.* 44, pp. 5691-5702.

Wold, S. (1987), "Principal Component Analysis," *Chemometrics and Intelligent Laboratory Systems* 2, pp. 37-52.

Press et al., "*Numerical Recipes in C: The Art of Scientific Computing*," $2^{nd}$ Edition, by W. H. Press, 1992, pp. 408-412.

Hall et al., "*An Introduction to Multisensor Data Fusion*", Proceedings of the IEEE, vol. 85, No. 1, Jan. 1997, pp. 6-23.

* cited by examiner

DRILLING ADVISORY SYSTEMS AND METHODS WITH DECISION TREES FOR LEARNING AND APPLICATION MODES

CROSS REFERENCE TO RELATED APPLICATIONS

This application claims the benefit of U.S. Provisional Application No. 61/531,926, filed Sep. 7, 2011. This application is also related to and is filed concurrently with U.S. Non-Provisional patent application Ser. No. 13/605,453, filed Sep. 6, 2012, entitled "Drilling Advisory Systems And Methods With Combined Global Search and Local Search Methods".

FIELD

The present disclosure relates generally to systems and methods for improving drilling related operations. More particularly, the present disclosure relates to systems and methods that may be implemented in cooperation with hydrocarbon-related drilling operations to improve drilling performance.

BACKGROUND

This section is intended to introduce the reader to various aspects of art, which may be associated with embodiments of the present invention. This discussion is believed to be helpful in providing the reader with information to facilitate a better understanding of particular techniques of the present invention. Accordingly, it should be understood that these statements are to be read in this light, and not necessarily as admissions of prior art.

The oil and gas industry incurs substantial operating costs to drill wells in the exploration and development of hydrocarbon resources. The cost of drilling wells may be considered to be a function of time due to the equipment and manpower expenses based on time. The drilling time can be minimized in at least two ways: 1) maximizing the Rate-of-Penetration (ROP) (i.e., the rate at which a drill bit penetrates the earth); and 2) minimizing the non-drilling rig time (e.g., time spent on tripping equipment to replace or repair equipment, constructing the well during drilling, such as to install casing, and/or performing other treatments on the well). Past efforts have attempted to address each of these approaches. For example, drilling equipment is constantly evolving to improve both the longevity of the equipment and the effectiveness of the equipment at promoting a higher ROP. Moreover, various efforts have been made to model and/or control drilling operations to avoid equipment-damaging and/or ROP limiting conditions, such as vibrations, bit-balling, etc.

Many attempts to reduce the costs of drilling operations have focused on increasing ROP. For example, U.S. Pat. Nos. 6,026,912; 6,293,356; and 6,382,331 each provide models and equations for use in increasing the ROP. In the methods disclosed in these patents, the operator collects data regarding a drilling operation and identifies a single control variable that can be varied to increase the rate of penetration. In most examples, the control variable is Weight On Bit (WOB); the relationship between WOB and ROP is modeled; and the WOB is varied to increase the ROP. While these methods may result in an increased ROP at a given point in time, this specific parametric change may not be in the best interest of the overall drilling performance in all circumstances. For example, bit failure and/or other mechanical problems may result from the increased WOB and/or ROP. While an increased ROP can drill further and faster during the active drilling, delays introduced by damaged equipment and equipment trips required to replace and/or repair the equipment can lead to a significantly slower overall drilling performance. Furthermore, other parametric changes, such as a change in the rate of rotation of the drillstring (RPM), may be more advantageous and lead to better drilling performance than simply optimizing along a single variable.

Because drilling performance is measured by more than just the instantaneous ROP, methods such as those discussed in the above-mentioned patents are inherently limited. Other research has shown that drilling rates can be improved by considering the Mechanical Specific Energy (MSE) of the drilling operation and designing a drilling operation that will minimize MSE. For example, U.S. Pat. Nos. 7,857,047, and 7,896,105, each of which is incorporated herein by reference in their entirety for all purposes, disclose methods of calculating and/or monitoring MSE for use in efforts to increase ROP. Specifically, the MSE of the drilling operation over time is used to identify the drilling condition limiting the ROP, often referred to as a "founder limiter". Once the founder limiter has been identified, one or more drilling variables can be changed to overcome the founder limiter and increase the ROP. As one example, the MSE pattern may indicate that bit-balling is limiting the ROP. Various measures may then be taken to clear the cuttings from the bit and improve the ROP, either during the ongoing drilling operation or by tripping and changing equipment.

Recently, additional interest has been generated in utilizing artificial neural networks to optimize the drilling operations, for example U.S. Pat. Nos. 6,732,052, 7,142,986, and 7,172,037. However the limitations of neural network based approaches constrain their further application. For instance, the result accuracy is sensitive to the quality of the training dataset and network structures. Neural network based optimization is limited to local search and has difficulty in processing new or highly variable patterns.

In another example, U.S. Pat. No. 5,842,149 disclosed a close-loop drilling system intended to automatically adjust drilling parameters. However, this system requires a look-up table to provide the relations between ROP and drilling parameters. Therefore, the optimization results depend on the effectiveness of this table and the methods used to generate this data, and consequently, the system may lack adaptability to drilling conditions which are not included in the table. Another limitation is that downhole data is required to perform the optimization.

While these past approaches have provided some improvements to drilling operations, further advances and more adaptable approaches are still needed as hydrocarbon resources are pursued in reservoirs that are harder to reach and as drilling costs continue to increase. Further desired improvements may include expanding the optimization efforts from increasing ROP to optimizing the drilling performance measured by a combination of factors, such as ROP, efficiency, downhole dysfunctions, etc. Additional improvements may include expanding the optimization efforts from iterative control of a single control variable to control of multiple control variables. Moreover, improvements may include developing systems and methods capable of recommending operational changes during ongoing drilling operations.

International patent publications WO2011016927 and WO20110216928 disclosed a data-driven based advisory system. Those advisory systems include use of a PCA (principal component analysis) method to compute the correlations between controllable drilling parameters and an objective function. This objective function can be either a single-variable based performance measurement (MSE, ROP, DOC, or bit friction factor mu) or a mathematical combination of MSE, ROP, and other performance variables such as vibration measurement. Since PCA is based on a local search of a subset of the relevant data in a window of interest (the window can be over an interval of formation depth or over time), the searched results may become trapped at local optimum points (sometimes called stationary points).

SUMMARY

The present methods are directed to methods and systems for use in drilling a wellbore, such as a wellbore used in hydrocarbon production related operations. What is needed in the art is a way to integrate local search methods such as PCA with wider window or global search methods, and then delineate the pros and cons of each, or the calculated results of each, to mitigate this type of issue. Global searches are searches that are performed on an entire window or interval of relevant data, whereas local searches are performed on subsets of the windowed data. The data may come from one well or from a collection of wells.

In one aspect, the improvements provided and discussed herein may include a method of drilling a wellbore through subterranean formation, the method comprising: receiving data regarding at least two drilling operational parameters related to wellbore drilling operations; running a global search engine to optimize at least two controllable drilling parameter values and separately running a local search engine to optimize the at least two controllable drilling parameter values, each optimization based on at least one objective function; determining a further optimized recommendation for the at least two controllable drilling parameters based upon the optimized results of the global and local search engines; using decision trees to select between an application mode of generating a still further optimized recommendation for the optimized at least two controllable drilling parameter values and a learning mode of generating a still further optimized recommendation for the optimized at least two controllable drilling parameter values; using the selected application mode to determine an operational updates to at least one of the at least two controllable drilling parameters based at least in part on the still further optimized recommendation; and implementing at least one of the determined operational updates in the wellbore drilling operations.

In other aspects, the improvements provided and discussed herein may include a computer-based system for use in association with drilling operations, the computer-based system comprising: a processor adapted to execute instructions; a storage medium in communication with the processor; and at least one instruction set accessible by the processor and saved in the storage medium; wherein the at least one instruction set is adapted to: receiving data regarding at least two drilling operational parameters related to wellbore drilling operations; running a global search engine to optimize at least two controllable drilling parameter values and separately running a local search engine to optimize the at least two controllable drilling parameter values, each optimization based on at least one objective function; determining a further optimized recommendation for the at least two controllable drilling parameters based upon the optimized results of the global and local search engines; using decision trees to select between an application mode of generating a still further optimized recommendation for the optimized at least two controllable drilling parameter values and a learning mode of generating a still further optimized recommendation for the optimized at least two controllable drilling parameter values; using the selected application mode to determine an operational updates to at least one of the at least two controllable drilling parameters based at least in part on the still further optimized recommendation; and exporting the determined operational updates to an output device for use in ongoing drilling operations.

An exemplary method may include steps such as: 1) receiving data regarding drilling parameters characterizing wellbore drilling operations; 2) conducting the drilling process to determine a value or values of an objective function or a drilling performance parameter for the controllable drilling parameters in the pattern; 3) identifying a trend in the objective function or drilling performance parameter for this pattern of controllable drilling parameters; 4) using one or more local search engines and/or one or more global search engines to find the optimized value, separately (i.e. optimal values of the controllable variables) from a moving window of historical data; 5) performing statistical tests of local and/or global search engine and/or data fusion optimized value(s) to choose appropriate branches of one or more decision trees; 6) utilizing one or more decision trees for selecting between application modes and learning modes of generating operational recommendations for one, two, or more controllable drilling parameters in consideration of a dysfunction map; 7) determining operational updates to at least one controllable drilling parameter based at least in part on the decision tree methods; and 8) implementing at least one of the determined operational updates in the ongoing drilling operations.

As a specific example, consider the scenario where drilling has just begun, and the learning mode is active at the start. The learning mode generates initial grid points for the global search method and displays the parameters of the grid points to the driller. Drilling is conducted according to the parameters generated by the learning mode, and certain parameters may be omitted from the dataset if the resulting objective function is outside of a defined range. Drilling data such as WOB, RPM, flow rate, and MSE data are collected every 5 seconds over the course of a given drilling operation. The collected data is used to populate a windowed parameter space, where a given element in the space is defined as a measured WOB, RPM, flow rate, and the objective function for a given instance in time within the ranges of WOB, RPM, flow rate, objective function, and time defined for the window. By definition, the parameter space contains data or measurements associated with a prescribed moving window which in this example we take as the immediate previous 60 minutes of drilling. The parameter space is therefore continuously updated to account for new data points entering and old data points leaving the 60 minute moving window. After an initial grid search is completed or, perhaps, terminated on the basis of the drilling results, a decision tree method may be used to determine whether to continue the learning mode or start the application mode. If statistical quality tests are passed, an application mode is activated to display recommendations based on a combination or selection (i.e., "data fusion") of results from global search and/or local search methods. If during the application mode, there is an insufficient amount of data points within a prescribed neighborhood of the global search results, such as fewer than 20 data points for example, the local search mode is activated.

A dysfunction map may be used in the decision tree method to select between multiple learning modes. When a given learning mode is activated by the decision tree, controllable drilling parameters are recommended to be incremented a prescribed amount (for learning purposes). For example, depending upon which region of the dysfunction map is considered active, a branch in the decision tree is used to determine whether and by what amounts the WOB and rotary speed (RPM) are to be either increased or decreased. The branch may also prescribe the order in which the controllable drilling parameters should be changed (e.g., recommendation to change the WOB and then the RPM or vice versa). The collected data points considered by a given branch in the decision tree could be analyzed as individual points, a moving average of points, or as setpoints for each of the controllable parameters, such as WOB, RPM and flow. There are a number of additional ways within multiple decision trees for the learning mode to be activated including but not limited to a detection of a change in response, insufficient data within the parameter ranges of interest, low statistical metrics of the quality of the global, local, or data fusion results, time or footage beyond a defined cutoff, location within a specific regime on a dysfunction map, and combinations of the above.

The decision tree may include a knowledge-based approach. As one example, the field experience may be summarized by an expert system, for which one embodiment may be a lookup table. For example, when drilling is relatively free of dysfunction, i.e. a "good" state, we need to increase the WOB and/or RPM to increase ROP until the inception of dysfunction is detected. For example, the downhole stick-slip state may become severe or exceed a certain threshold. Then we may need to gradually increase RPM or reduce WOB to mitigate the stick-slip but still maintain ROP. Therefore, a what-if lookup table can be developed based on previous field knowledge. While drilling, the four major drilling states (good, whirl, stick-slip, and coupled whirl-stick-slip) can be identified from drilling data either in real-time or near real-time. Then the recommendations for changing drilling parameters can be obtained by checking the lookup table. This is one example of a decision tree.

The present disclosure is further directed to computer-based systems for use in association with drilling operations. Exemplary computer-based systems may include: 1) a processor adapted to execute instructions; 2) a storage medium in communication with the processor; and 3) at least one instruction set accessible by the processor and saved in the storage medium. The at least one instruction set is adapted to perform the methods described herein. For example, the instruction set may be adapted to: 1) receive data regarding drilling parameters characterizing ongoing wellbore drilling operations; 2) run local search and global search engines to compute the optimized values for the controllable parameters, respectively; 3) perform statistical tests of the search engine and/or data fusion results to choose an appropriate data fusion algorithm; 4) generate operational recommendations for the one or more controllable drilling parameters, wherein the recommendations are obtained by a data fusion algorithm based on the results from local search and global search engines (the algorithm may combine local and/or global search results, or select from multiple local or global search results); 5) apply a decision tree method to the individual local or global search engine results, or to the data fusion results, for the purpose of providing operational recommendations to at least one controllable drilling parameter; and 6) export the generated operational recommendations for consideration in controlling ongoing drilling operations.

The present disclosure is also directed to drilling rigs and other drilling equipment adapted to perform the methods described herein. For example, the present disclosure is directed to a drilling rig system comprising: 1) a communication system adapted to receive data regarding at least two drilling parameters relevant to ongoing wellbore drilling operations; 2) a computer-based system according to the description herein, such as one adapted to perform the methods described herein; and 3) an output system adapted to communicate the generated operational recommendations for consideration in controlling drilling operations. The drilling equipment may further include a control system adapted to determine operational updates based at least in part on the generated operational recommendations and to implement at least one of the determined operational updates during the drilling operation. The control system may be adapted to implement at least one of the determined operational updates at least substantially automatically.

BRIEF DESCRIPTION OF THE DRAWINGS

The foregoing and other advantages of the present technique may become apparent upon reading the following detailed description and upon reference to the drawings in which.

DETAILED DESCRIPTION

Figure 1:
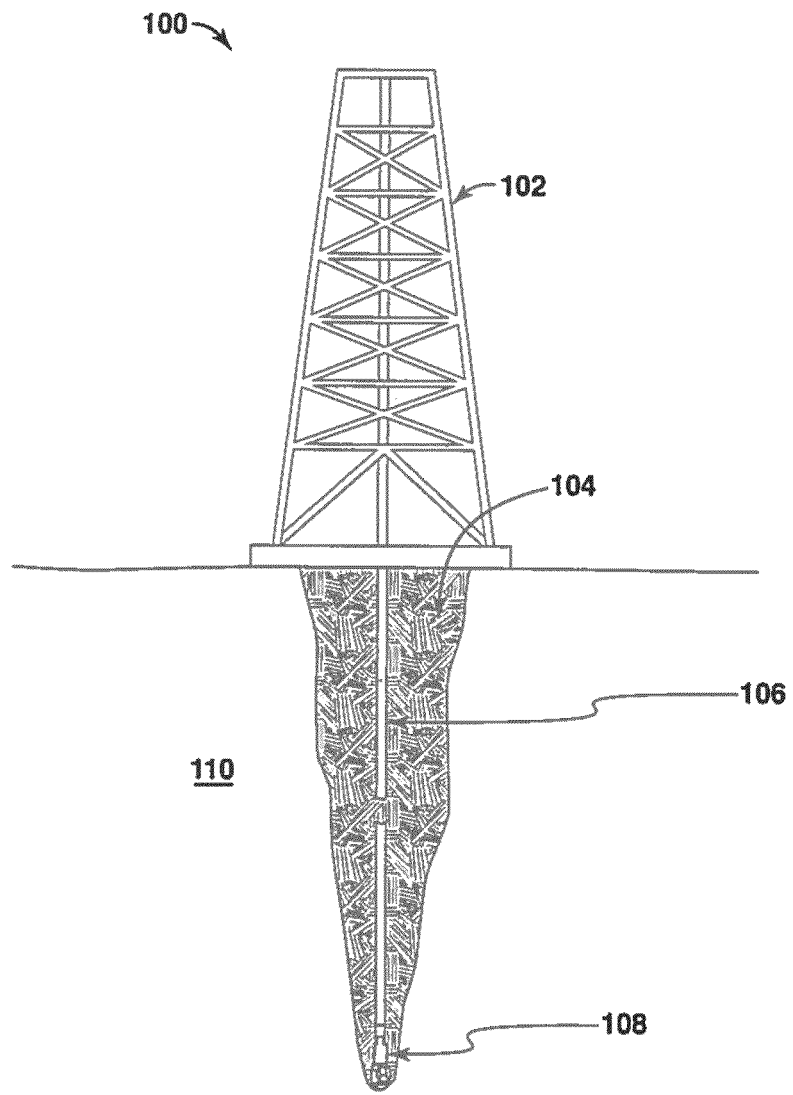
FIG. 1 is schematic view of a well showing the environment in which the present systems and methods may be implemented.

In the following detailed description, specific aspects and features of the present improvements are described in connection with several embodiments. However, to the extent that the following description is specific to a particular embodiment or a particular use of the present techniques, it is intended to be illustrative only and merely provides a concise description of exemplary embodiments. Moreover, in the event that a particular aspect or feature is described in connection with a particular embodiment, such aspects and features may be found and/or implemented with other embodiments of the present invention where appropriate. Accordingly, the invention is not limited to the specific embodiments described below. But rather, the invention includes all alternatives, modifications, and equivalents falling within the scope of the appended claims.

The presently disclosed systems and methods may be generally summarized to include aspects of the following steps: 1) receiving data regarding drilling parameters wherein one, two, or more of the drilling parameters are controllable; 2) utilizing a statistical model to identify one, two, or more controllable drilling parameters having significant correlation to either an objective function incorporating two or more drilling performance measurements or some other drilling performance measurement; 3) generating operational recommendations for one, two, or more controllable drilling parameters, wherein the operational recommendations are selected to optimize the objective function or the drilling performance measurement, respectively; 4) determining operational updates to at least one controllable drilling parameter based at least in part on the generated operational recommendations; and 5) implementing at least one of the determined operational updates in the ongoing drilling operations. These disclosed and taught methods and systems may be further improved by implementing the additional methods and systems disclosed and claimed herein which are designed to facilitate field operations to render a drilling advisory system that may be readily reduced to practice.

In this regard, there are several operational aspects to consider. First, when the bit touches the formation at the initiation of the drilling process, the driller should have a planned set of operating conditions that comprises a drilling operation sequence. This set of conditions is called a "grid" with grid points corresponding to each combination of operating parameters, including but not limited to WOB, RPM, flow rate, and pump strokes per minute. These operating parameters are considered independent variables whereas measurements or objective functions such as MSE, ROP, DOC, and bit coefficient of friction (mu) are considered dependent variables. Objective functions may also include mathematical combinations of commonly used functions such as MSE, ROP, DOC, and mu. Secondly, the driller also needs to know in advance the operational steps to utilize the system when changes in the drilling environment are observed. The system needs to be able to update its results as rapidly as the driller would do in the absence of such a system or method, otherwise the system may be deemed partially or wholly ineffective. Third, the drilling environment is known to change with time and depth for various and sundry reasons known to those in the art, and the drilling advisory systems and methods should periodically probe the operating parameter space to discern such changes. When there is insufficient data to provide statistically valid parameters for optimizing drilling performance over the operating parameter space, the data fusion algorithm could be altered to make parameter recommendations for the purpose of obtaining additional data. The systems and methods discussed herein, comprising combinations of grid search methods with statistical methods, are designed to provide drilling parameter recommendations in a robust manner to either optimize drilling performance or obtain sufficient data to establish statistical validity of the search or data fusion results. At the same time, these improvements will also provide the capability for rapid adjustment to changes in the drilling environment as the drilling progresses. This disclosure provides enhancements to these systems and methods to satisfy one or more of these needs.

FIG. 1 illustrates a side view of a relatively generic drilling operation at a drill site 100. FIG. 1 is provided primarily to illustrate the context in which the present systems and methods may be used. As illustrated, the drill site 100 is a land based drill site having a drilling rig 102 disposed above a well 104. The drilling rig 102 includes a drillstring 106 including a drill bit 108 disposed at the end thereof. The apparatus illustrated in FIG. 1 are shown in almost schematic form to show the representative nature thereof. The present systems and methods may be used in connection with any currently available drilling equipment and is expected to be usable with any future developed drilling equipment. Similarly, the present systems and methods are not limited to land based drilling sites but may be used in connection with offshore, deepwater, arctic, and the other various environments in which drilling operations are conducted.

While the present systems and methods may be used in connection with any drilling operation, they are expected to be used primarily in drilling operations related to the recovery of hydrocarbons, such as oil and gas. Additionally, it is noted here that references to drilling operations are intended to be understood expansively. Operators are able to remove rock from a formation using a variety of apparatus and methods, some of which are different from conventional forward drilling into virgin formation. For example, reaming operations, in a variety of implementations, also remove rock from the formation. Accordingly, the discussion herein referring to drilling parameters, drilling performance measurements, etc., refers to parameters, measurements, and performance during any of the variety of operations that cut rock away from the formation. As is well known in the drilling industry, a number of factors affect the efficiency of drilling operations, including factors within the operators' control and factors that are beyond the operators' control. For the purposes of this application, the term drilling conditions will be used to refer generally to the conditions in the wellbore during the drilling operation. The drilling conditions are comprised of a variety of drilling parameters, some of which relate to the environment of the wellbore and/or formation and others that relate to the drilling activity itself. For example, drilling parameters may include rotary speed (RPM), WOB, characteristics of the drill bit and drillstring, mud weight, mud flow rate, lithology of the formation, pore pressure of the formation, torque, pressure, temperature, ROP, MSE, vibration measurements, etc. As can be understood from the list above, some of the drilling parameters are controllable and others are not. Similarly, some may be directly measured and others must be calculated based on one or more other measured parameters.

As drilling operations progress, the drill bit 108 advances through the formation 110 at a rate known as the rate of penetration (108), which is commonly calculated as the measured depth drilled over time. As the formation conditions depend on location, depth, and even time, the drilling conditions necessarily change over time within a given wellbore. Moreover, the drilling conditions may change in manners that dramatically reduce the efficiencies of the drilling operation and/or that create less preferred operating conditions. Accordingly, research is continually seeking improved methods of predicting and detecting changes in drilling conditions. As described in the Background above, the past research has focused on local search based optimization schemes such as neural networks or statistical methods. Since the searched results may be trapped at local optimum points (also called stationary points), these algorithms may not always provide the best solution. On the other hand, some empirical methods also have been used to find the "best" drilling parameters within a data window but cannot determine which direction to change a parameter to find a new set of optimized parameters better than the past parameters. The present systems and methods provide at least one improvement over these paradigms.

Figure 2:
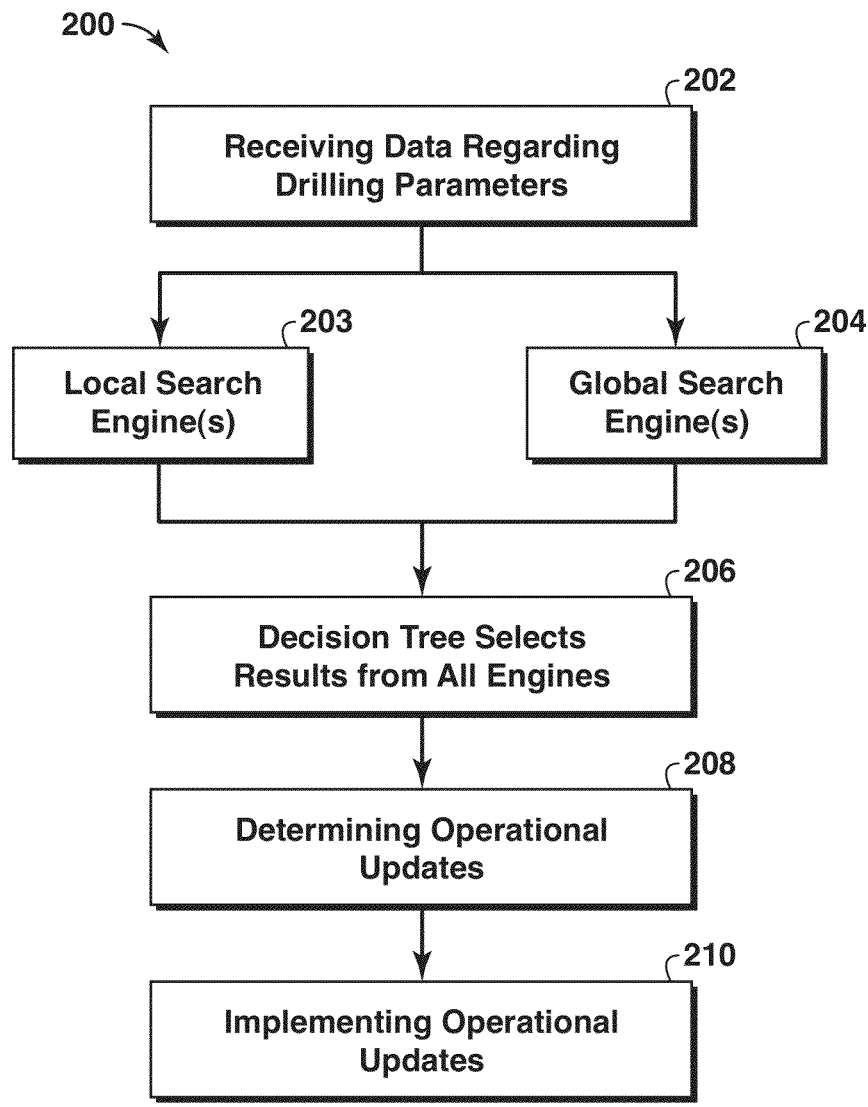
FIG. 2 is a flow chart of methods for updating operational parameters to optimize drilling operations.

As illustrated in FIG. 2, the present invention includes methods of drilling a wellbore 200. FIG. 2 provides an overview of the methods disclosed herein, which will be expanded upon below. In its most simple explanation, the present methods of drilling include: 1) receiving data regarding ongoing drilling operations, specifically data regarding drilling parameters that characterize the drilling operations, at 202; 2) executing a local search engine 203 and a global search engine 204 either in serial or in parallel mode; 3) generating operational recommendations to optimize drilling performance based on a data fusion method, at 206; 4) using a decision tree method to select from the individual global, local, or data fusion results at 207 for application mode, or, alternatively, switching the algorithm to a learning mode, in consideration of a drilling dysfunction map; 5) determining operational updates, at 208; and 6) implementing the operational updates, at 210.

The step 202 of receiving data regarding ongoing drilling operations includes receiving data regarding drilling parameters that characterize the ongoing drilling operations. At least one of the drilling parameters received is a controllable drilling parameter, such as RPM, WOB, and mud flow rate. It is to be understood that "receiving drilling parameters" includes all of the means of deriving information about a process parameter. For example, considering the WOB or RPM, the system may record the parameter setpoint provided by the driller using the drilling system controls (or using an automated system to accomplish same), the value may be measured by one or more instruments attached to the equipment, or the data may be processed to achieve a derived or inferred parameter value. For systems that return the measured values of parameters, such as WOB or RPM, the setpoint values may be calculated or inferred from the values recorded by the instrument. In this context, all of these inclusively refer to the "received drilling parameters." The data may be received in any suitable manner using equipment that is currently available or future developed technology. Similarly, the data regarding drilling parameters may come from any suitable source. For example, data regarding some drilling parameters may be appropriately collected from surface instruments while other data may be more appropriately collected from downhole measurement devices.

As one more specific example, data may be received regarding the drill bit rotation rate, an exemplary drilling parameter, either from the surface equipment or from downhole equipment, or from both surface and downhole equipment. The surface equipment may either provide a controlled rotation rate (setpoint, gain, etc.) as an input to the drilling equipment or a measured torque and RPM data, from which downhole bit rotary speed may be estimated. The downhole bit rotation rate can also be measured and/or calculated using one or more downhole tools. Any suitable technology may be used in cooperation with the present systems and methods to provide data regarding any suitable assortment of drilling parameters, provided that the drilling parameters are related to and can be used to characterize ongoing drilling operations and provided that at least one of the drilling parameters is directly or indirectly controllable by an operator.

Combined Methods

As indicated above, the methods include, at 203, a local search engine that utilizes a statistical model to identify at least one controllable drilling parameter having significant correlation to an objective function, or one or more objective functions, incorporating two or more drilling performance measurements, such as ROP, MSE, vibration measurements, etc., and mathematical combinations thereof. In some implementations, two or more statistical models may be used in cooperation, synchronously, iteratively, or in other arrangements to identify the significantly correlated and controllable drilling parameters. In some implementations, the statistical model may be utilized in substantially real-time utilizing the received data. Exemplary local search engines may include gradient ascent search, PCA (principal component analysis), Powell's method, etc. The methods also include, at 204, a global search engine to construct the response surface of the selected objective function with respect to controllable drilling parameters in a 3-D surface or a hyperplane in N-dimensional space, by any regression or interpolation methods, and to find an optimal point from the response surface. Note that the local and global engines 203 and 204 may be running in serial and/or parallel mode.

In general terms, both global and local engines search in a hyperdimensional space consisting of one or more drilling parameters and at least one objective function, which incorporates two or more drilling performance measurements and determines the degree of correlation between the objective function and the drilling parameters. By way of example, the objective function may be a single variable of ROP, MSE, Depth of Cut (DOC), bit friction factor mu, and/or mathematical combinations thereof. The objective function may also be a function of ROP, MSE, DOC, mu, weight on bit, drill string parameters, bit rotation rate, torque applied to the drillstring, torque applied to the bit, vibration measurements, hydraulic horsepower (e.g., mud flow rate, viscosity, pressure, etc.) etc., and mathematical combinations thereof. Additional details and examples of utilizing the search engines to identify optimal drilling parameters are provided below.

Basically, the local and global search engines generate recommendations separately for the controllable drilling parameters in serial and/or parallel mode. Then at 206, a method is used to fuse the recommendations from the two engines or select between the two engines. The embodiments of the data fusion method may include using weighted averaging, power-law averaging, Murphy's averaging, fuzzy logic, Dempster-Shafer (D-S) Evidence, Kalman filter, and Bayesian networks. Furthermore, the method of combining the search results using data fusion may change with time and with changes in the drilling parameter values. At 207, a decision tree is used to select an application mode or a learning mode, based on the data fusion results and the quality of the data and the fusion results. Compared to the traditional drilling optimization methods, such as statistical methods or neural networks, the main benefit of using decision trees to select from multiple global and local search engines is that decision trees can be used under a wide variety of operating conditions and may consider known physics of the drilling operation, such as a dysfunction map, and can incorporate other expert knowledge.

In some implementations, the decision tree recommendations may provide qualitative recommendations, such as increase, decrease, or maintain a given drilling parameter (e.g., weight on bit, rotation rate, etc.), or the recommendation might be to pick up off bottom. Additionally or alternatively, the recommendations may provide quantitative recommendations, such as to increase a drilling parameter by a particular measure or percentage or to decrease a drilling parameter to a particular value or range of values. In some implementations, the operational recommendations may be subject to boundary limits, such as maximum rate of rotation, minimum acceptable mud flow rate, top-drive torque limits, maximum duration of a specified level of vibrations, etc., that represent either physical equipment limits or limits derived by consideration of other operational aspects of the drilling process. For example, there may be a minimum acceptable mud flow rate to transport drill cuttings to the surface and/or a maximum acceptable rate above which the equivalent circulating density becomes too high. In the decision tree method, the data fusion results may be accepted or rejected (application mode), or an alternative path may be selected based on other information, such as selection of a learning mode.

Continuing with the discussion of FIG. 2, the step of determining operational updates, at 208, includes determining operational updates to at least one controllable drilling parameter, which determined operational updates are based at least in part on the generated operational recommendations. Similar to the generation of operational recommendations and as will be discussed in greater detail below, the determined operational update for a given drilling parameter may include directional updates and/or quantified updates. For example, the determined operational update for a given drilling parameter may be selected from increase/decrease/maintain/pickup commands or may quantify the degree to which the drilling parameter should be changed, such as increasing or decreasing the weight on bit by X and increasing or decreasing the rotation rate by Y.

The step of determining operational updates may be performed by one or more operators (i.e., individuals at the rig site or in communication with the drilling operation) and computer-based systems. For example, drilling equipment is being more and more automated and some implementations may be adapted to consider the operational recommendations alone or together with other data or information and determine operational updates to one or more drilling parameters. Additionally or alternatively, the drilling equipment and computer-based systems associated with the present methods may be adapted to present the operational recommendations to a user, such as an operator, who determines the operational updates based at least in part on the operational recommendations. The user may determine the operational updates based at least in part on the operational recommendations using "hog laws" or other experienced based methods and/or by using computer-based systems.

Finally, the step of implementing at least one of the determined operational updates in the ongoing drilling operation, at 210, may include modifying and/or maintaining at least one aspect of the ongoing drilling operations based at least in part on the determined operational updates. In some implementations, such as when the operational updates are determined by computer-based systems from the operational recommendations, the implementation of the operational updates may be automated to occur without user intervention or approval. Additionally or alternatively, the operational updates determined by a computer-based system may be presented to a user for consideration and approval before implementation. For example, the user may be presented with a visual display of the proposed determined operational updates, which the user can accept in whole or in part without substantial steps between the presentation and the implementation. For example, the proposed updates may be presented with 'accept' and 'change' command buttons or controls and with 'accept all' functionality. In such implementations, the implementation of the determined operational updates may be understood to be substantially automatic as the user is not required to perform calculations or modeling to determine the operational update or to perform several manual steps to effect the implementation. Additionally or alternatively, the implementation of the determined operational updates may be effected by a user after a user or other operator has considered the operational recommendations and determined the operational updates.

While specific examples of implementations within the scope of the above described method and within the scope of the claims are described below, it is believed that the description provided above and in connection with FIG. 2 illustrates at least one improvement over the paradigms of the previous efforts. Specifically, it consists of global and local search engines calculating recommended parameters and use of a data fusion module to combine the recommendations from multiple search engines, followed by a decision tree method to accept or reject these results and choose between learning and application modes, based in part on the knowledge of a drilling dysfunction map. This new approach can mitigate the issue that recommendation results may be trapped at a local minimum point of the response surface. This is a common issue for many local search based optimization methods such as neural networks and gradient search methods. Typically, the inclusion of a global search method also provides a search over a wider parameter set than a local search method. Compared to some common empirical optimization methods, this new approach also offers more adaptability to the input data stream.

Although reference herein is to using a global and a local search engine, more generally the data fusion method could use more than one search engine of each type. The data fusion algorithm would then be adjusted to combine the results in such a way as to provide the most optimum results based on some measure of drilling criteria, statistical significance, or a combination of the drilling and statistical methods.

Figure 3:
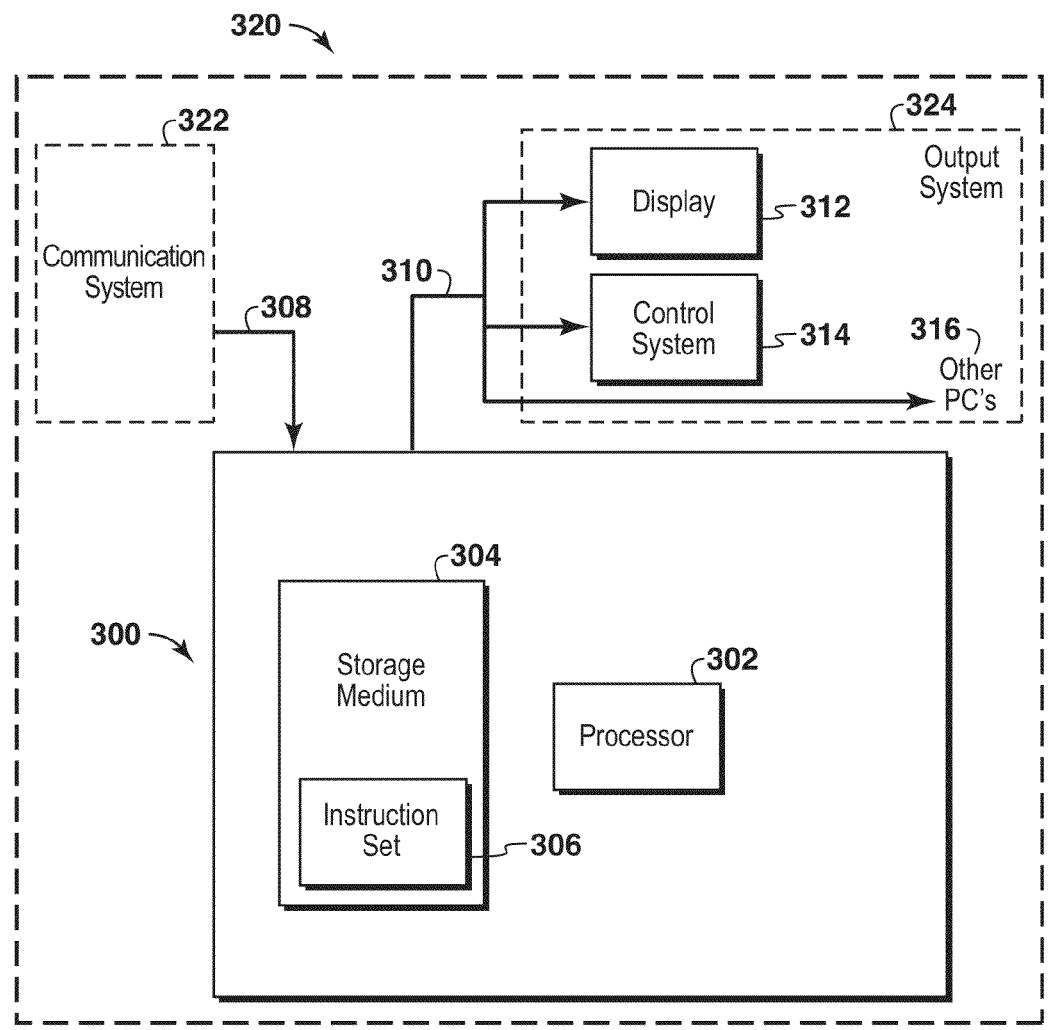
FIG. 3 is a schematic view of systems within the scope of the present invention.

FIG. 3 schematically illustrates systems within the scope of the present invention. In some implementations, the systems comprise a computer-based system 300 for use in association with drilling operations. The computer-based system may be a computer system, may be a network-based computing system, and/or may be a computer integrated into equipment at the drilling site. The computer-based system 300 comprises a processor 302, a storage medium 304, and at least one instruction set 306. The processor 302 is adapted to execute instructions and may include one or more processors now known or future developed that is commonly used in computing systems. The storage medium 304 is adapted to communicate with the processor 302 and to store data and other information, including the at least one instruction set 306. The storage medium 304 may include various forms of electronic storage mediums, including one or more storage mediums in communication in any suitable manner. The selection of appropriate processor(s) and storage medium(s) and their relationship to each other may be dependent on the particular implementation. For example, some implementations may utilize multiple processors and an instruction set adapted to utilize the multiple processors so as to increase the speed of the computing steps. Additionally or alternatively, some implementations may be based on a sufficient quantity or diversity of data that multiple storage mediums are desired or storage mediums of particular configurations are desired. Still additionally or alternatively, one or more of the components of the computer-based system may be located remotely from the other components and be connected via any suitable electronic communications system. For example, some implementations of the present systems and methods may refer to historical data from other wells, which may be obtained in some implementations from a centralized server connected via networking technology. One of ordinary skill in the art will be able to select and configure the basic computing components to form the computer-based system.

Importantly, the computer-based system 300 of FIG. 3 is more than a processor 302 and a storage medium 304. The computer-based system 300 of the present disclosure further includes at least one instruction set 306 accessible by the processor and saved in the storage medium. The at least one instruction set 306 is adapted to perform the methods of FIG. 2 as described above and/or as described below. As illustrated, the computer-based system 300 receives data at data input 308 and exports data at data export 310. The data input and output ports can be serial port (DB-9 RS232), LAN or wireless network, etc. The at least one instruction set 306 is adapted to export the generated operational recommendations for consideration in controlling drilling operations. In some implementations, the generated operational recommendations may be exported to a display 312 for consideration by a user, such as a driller. In other implementations, the generated operational recommendations may be provided as an audible signal, such as up or down chimes of different characteristics to signal a recommended increase or decrease of WOB, RPM, or some other drilling parameter. In a modern drilling system, the driller is tasked with monitoring of onscreen indicators, and audible indicators, alone or in conjunction with visual representations, may be an effective method to convey the generated recommendations. The audible indicators may be provided in any suitable format, including chimes, bells, tones, verbalized commands, etc. Verbal commands, such as by computer generated voices, are readily implemented using modern technologies and may be an effective way of ensuring that the right message is heard by the driller. Additionally or alternatively, the generated operational recommendations may be exported to a control system 314 adapted to determine at least one operational update. The control system 314 may be integrated into the computer-based system or may be a separate component. Additionally or alternatively, the control system 314 may be adapted to implement at least one of the determined updates during the drilling operation, automatically, substantially automatically, or upon user activation.

Continuing with the discussion of FIG. 3, some implementations of the present technologies may include drilling rig systems or components of the drilling rig system. For example, the present systems may include a drilling rig system 320 that includes the computer-based system 300 described herein. The drilling rig system 320 of the present disclosure may include a communication system 322 and an output system 324. The communication system 322 may be adapted to receive data regarding at least two drilling parameters relevant to ongoing drilling operations. The output system 324 may be adapted to communicate the generated operational recommendations and/or the determined operational updates for consideration in controlling drilling operations. The communication system 322 may receive data from other parts of an oil field, from the rig and/or wellbore, and/or from another networked data source, such as the Internet. The output system 324 may be adapted to include displays 312, printers, control systems 314, other computers 316, network at the rig site, or other means of exporting the generated operational recommendations and/or the determined operational updates. The other computers 316 may be located at the rig or in remote offices. In some implementations, the control system 314 may be adapted to implement at least one of the determined operational updates at least substantially automatically. As described above, the present methods and systems may be implemented in any variety of drilling operations. Accordingly, drilling rig systems adapted to implement the methods described herein to optimize drilling performance are within the scope of the present invention. For example, various steps of the presently disclosed methods may be done utilizing computer-based systems and algorithms and the results of the presently disclosed methods may be presented to a user for consideration via one or more visual displays, such as monitors, printers, etc., or via audible prompts, as described above. Accordingly, drilling equipment including or communicating with computer-based systems adapted to perform the presently described methods are within the scope of the present invention.

Objective Functions

As described above in connection with FIG. 2, the present systems and methods optimize an objective function incorporating two or more drilling performance measurements by determining relationships between one or more controllable drilling parameters and the objective function (or, more precisely, the mathematical combination of the two or more drilling performance measurements). In some implementations, the two or more drilling performance measurements may be embodied in one or more objective functions adapted to describe or model the performance measurement in terms of at least two controllable drilling parameters. As described herein, relating the objective function to at least two controllable drilling parameters may provide additional benefits in the pursuit of an optimized drilling operation. As shown in equation (1), an objective function can be solely based on ROP, MSE, or DOC and is referenced at times herein to illustrate one or more of the differences between the present systems and methods and the conventional methods that merely seek to maximize ROP. Exemplary objective functions within the scope of the present invention are shown in equations (2) and (3). As shown, the objective function may be a function of two or more drilling performance measurements (e.g., ROP and/or MSE) and/or may be a function of controllable and measurable parameters. It is understood that the drilling parameters to be included in the objective functions include the setpoint values, measured values, or processed measured values to derive or infer setpoint values.

$$\text{OBJ} = \text{ROP} \tag{1.1}$$

$$\text{OBJ} = F(\text{MSE}) \tag{1.2}$$

where F is a mathematical function such as $F(x) = -(x)$ or $F = 1/(x)$.

$$OBJ = DOC = k\frac{ROP}{RPM} \tag{1.3}$$

where k is a unit factor. k=1/5 for DOC in inches/revolution, ROP in feet/hour, and RPM in revolution/minutes. k=16.67 for DOC in millimeters/revolution, ROP in meters/hour, and RPM in revolution/minutes.

$$\text{OBJ} = F(\mu) \tag{1.4}$$

where F is a mathematical function such as $F(x) = -(x)$ or $F = 1/(x)$, and the bit friction factor $\mu$ is defined as $$\mu = 3\frac{TQ_b}{WOB \cdot d} \tag{1.5}$$

where $TQ_b$ is the downhole bit torque due to bit-formation interaction, and d is the bit diameter or the hole size.

$$OBJ = \frac{\delta + ROP/ROP_o}{\delta + MSE/MSE_o}, \quad (2)$$

($\delta$ factor to be determined)

$$OBJ = \frac{\delta + \Delta ROP/ROP}{\delta + \Delta MSE/MSE}, \quad (3)$$

($\delta$ factor to be determined)

The objective function of equation (2) is to maximize the ratio of ROP-to-MSE (simultaneously maximizing ROP and minimizing MSE); the objective function of equation (3) is to maximize the ROP percentage increase per unit percentage increase in MSE where $\Delta ROP$ and $\Delta MSE$ are changes of ROP and MSE, respectively, from a first data point to a second data point. These objective functions can be used for different scenarios depending on the specific objective of the drilling operation. Note that equations (2) and (3) require a factor $\delta$ to avoid a singularity. Other formulations of the objective function OBJ(MSE, ROP) may be devised within the scope of the invention to avoid a possible divide-by-zero singularity. In equation (2), the nominal $ROP_0$ and $MSE_0$ are used to provide dimensionless values to account for varying formation drillability conditions. Such reference values may be specified by a user or determined from the data, such as, for example, using a moving average value.

It is also important to point out that the methodology and algorithms presented in this invention are not limited to these three types of objective functions. They are applicable to and cover any form of objective function adapted to describe a relationship between drilling parameters and drilling performance measurement. For example, it is observed that MSE is sometimes not sensitive to downhole torsional vibrations such as stick-slip events which may generate large oscillations in the rotary speed of a drillstring. Basically, there are two approaches to take the downhole stick-slip into account. One is to display the stick-slip severity as a surveillance indicator but still use the MSE-based objective functions as shown in equations (2) or (3) to optimize drilling performance. It is well-known that one means of mitigating stick-slip is to increase the surface RPM and/or reduce WOB. To optimize the objective function and reduce the stick-slip at the same time, the operational recommendation created from the model should be selected as the one that is compatible with the stick-slip mitigation. Another approach is to integrate the stick-slip severity (SS) into the objective functions, and equations (2)-(3) can be modified as $$OBJ(MSE, SS, ROP) = \frac{\delta + ROP/ROP_o}{\delta + MSE/MSE_o + SS/SS_o}, \quad (4)$$

($\delta$ factor to be determined), $$OBJ(MSE, SS, ROP) = \frac{\delta + \Delta ROP/ROP}{\delta + \Delta MSE/MSE + \Delta SS/SS}. \quad (5)$$

($\delta$ factor to be determined)

where a nominal $SS_0$ is used to provide dimensionless values. The said stick-slip severity for both approaches can be either real-time stick-slip measurements transmitted from a downhole vibration measurement tool or a model prediction calculated from the surface torque and the drillstring parameters. The stick-slip severity, SS, may be also used directly as an objective function

OBJ=−SS, OR OBJ=1/SS

Besides stick-slip surveillance while drilling, the other benefit of this objective function is to enable operational recommendations for off-bottom rotation. When the drillstring rotates off bottom, the bit is not engaged with the formation (ROP=0, so MSE becomes infinite) and none of the other objective functions are applicable. Note that, as illustrated in this example, the objective function itself may change in time.

While the above objective functions are written somewhat generically, it should be understood that each of the drilling performance measurements may be related to multiple drilling parameters. For example, a representative equation for the calculation of MSE is provided in equation (6):

$$MSE = \frac{(Torque \cdot RPM + ROP \cdot WOB)}{HoleArea \cdot ROP}. \quad (6)$$

Accordingly, when optimizing the objective function, multiple drilling parameters may be optimized simultaneously, which, in some implementations, may provide the generated operational recommendations. The constituent parameters of MSE shown in equation (6) suggest that alternative means to describe the objective functions in equations (1)-(5) may include various combinations of the independent parameters WOB, RPM, ROP, and Torque. Additionally, one or more objective functions may combine two or more of these parameters in various suitable manners, each of which is to be considered within the scope of the invention.

Local Search Methods

As described above, prior local search methods attempted to correlate a single control variable to a single measure of drilling performance (i.e., the rate of penetration) and to increase ROP by iteratively and sequentially adjusting the identified single control variable. The local search methods of the present systems and methods are believed to improve upon that paradigm by correlating control variables to two or more drilling performance measurements. At least some of the benefits available from such correlations are described herein; others may become apparent through continued implementation of the present systems and methods.

Additionally, some implementations of the present systems and methods may be adapted to correlate at least two drilling parameters with an objective function incorporating two or more drilling performance measurements. By correlating more than one drilling parameter to the objective function, multiple drilling parameters can be optimized simultaneously. As can be seen in the expressions below, changing or optimizing parameters simultaneously can lead to a different outcome compared to changing them sequentially. Any objective function OBJ can be expressed as a function (or relationship) of multiple drilling parameters; the expression of equation (7) utilizes two parameters for ease of illustration.

$$OBJ = f(x, y) \quad (7)$$

At any time during the drilling process, determined operational updates produced by the present methods can be expressed as in equation (8).

$$\Delta OBJ = \frac{\partial f}{\partial x}\bigg|_{x_{t_0}, y_{t_0}} \cdot \Delta x + \frac{\partial f}{\partial y}\bigg|_{x_{t_0}, y_{t_0}} \cdot \Delta y \quad (8)$$

In the sequential approach, however, the change is achieved in two steps: a change at a first time step and a second change at a subsequent time step, as seen in equation (9).

$$\Delta OBJ' = \frac{\partial f}{\partial x}\bigg|_{x_{t_0}, y_{t_0}} \cdot \Delta x + \frac{\partial f}{\partial y}\bigg|_{x_{t_1}, y_{t_1}} \cdot \Delta y \qquad (9)$$

As a result, the two paradigms for identifying parameter changes based on an objective function may produce dramatically different results. As one example of the differences between the two paradigms, it can be seen that with the simultaneous update paradigm of equation (8), the system state at time $t_0$ is used to determine all updates. However, in the sequential updates paradigm of equation (9), there is a first update corresponding to x at time $t_0$. After a time increment necessary to implement this update and identify the new system state at time $t_1$, a second update may be processed corresponding to parameter y. The latter method leads to a slower and less efficient update scheme, with corresponding reduction in drilling performance. Exemplary operational differences resulting from the mathematical differences illustrated above include an ability to identify multiple operational changes simultaneously, to obtain optimized drilling conditions more quickly, to control around the optimized conditions more smoothly, etc.

As described in connection with FIG. 2, the present systems and methods begin by receiving or collecting data regarding drilling parameters, at least one of which is controllable. The present technology utilizes a local search engine to find optimal values for at least one controllable drilling parameter. Exemplary local search engines that may be utilized include PCA (principal component analysis), multi-variable correlation analysis methods and/or principle component analysis methods. These statistical methods, their variations, and their analogous statistical methods are well known and understood by those in the industry. Additional statistical means that may be used to identify a recommended parameter change include Kalman filtering, partial least squares (PLS, alternative term is partial latent structure), autoregressive moving average (ARMA) model, hypothesis testing, etc. In the interest of clarity in focusing on the inventive aspects of the present systems and methods, reference is made to the various textbooks and other references available for background and explanation of these statistical methods. While the underlying statistical methods and mathematics are well known, the manner in which they are implemented in the present systems and methods is believed to provide significant advantages over the conventional, single parameter, iterative methods described above. Accordingly, the manner of using these statistical models and incorporating the same into the present systems and methods will be described in more detail.

Figure 4:
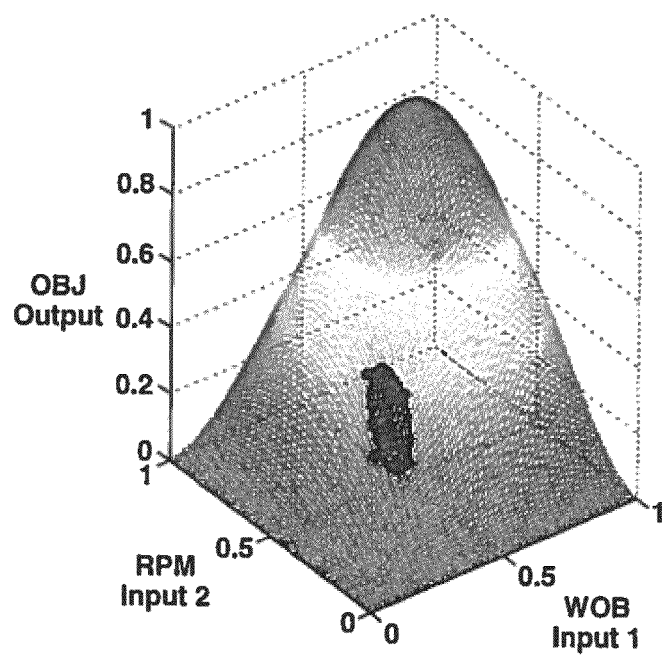
FIG. 4 illustrates the local search results moving along the gradient direction.
Figure 5:
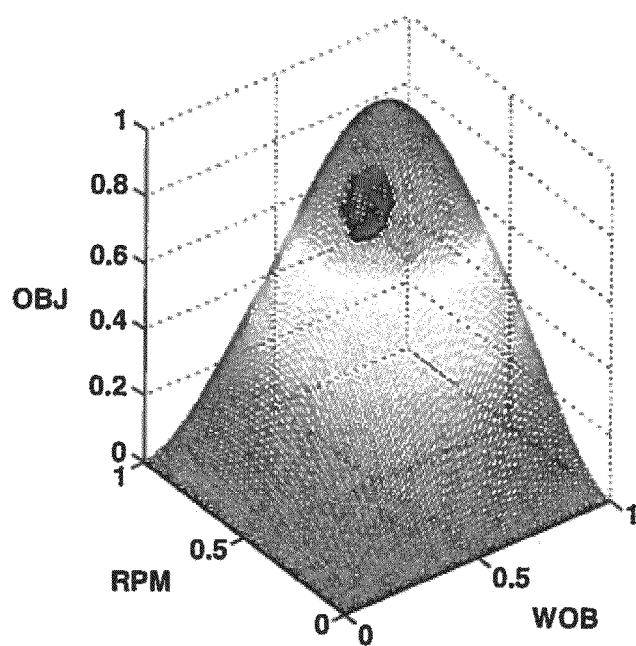
FIG. 5 illustrates the local search results close to the optimal point.

FIGS. 4 and 5 illustrate an example of searching the optimal point with a local search engine. Assume the objective function OBJ only depends on WOB and RPM, and there is only one peak within the operating ranges of WOB and RPM. Note that both RPM and WOB are normalized for illustration. Since the engine is based on local gradient, the recommended direction points along the gradient vector, and its step size is proportional to the slope. If the driller follows the recommendation, then the operating point, which is the cluster shown on the figures, moves towards the peak point. Since the step size is proportional to the slope, the step size will be close to zero when it reaches the peak point. In other words, the local search engine recommends staying at the optimal point when it gets there. In summary, (1) the local search engine can dynamically adjust the step size; (2) it is an iterative process and cannot find the optimal point at one step; (3) the effectiveness depends on the variations of the input data; (4) the searched results may be trapped at a local optimal point if the OBJ has multiple peaks. The previous patent publications WO2011016927 A1 and WO2011016928 A1 describe more details about the local search engine and the statistical method. The present invention will focus on disclosing the global search engine and its integration with the local search engine.

Global Search Methods

The global grid search engine assumes the objective function OBJ depends on the drilling controllable parameters (e.g., WOB, RPM, and flow rate) and finds the global optimal point from a windowed dataset. There may be two types of methods that can be used for the global search engines. One type is a response-surface based method, and the other is non-response-surface based method.

Figure 6:
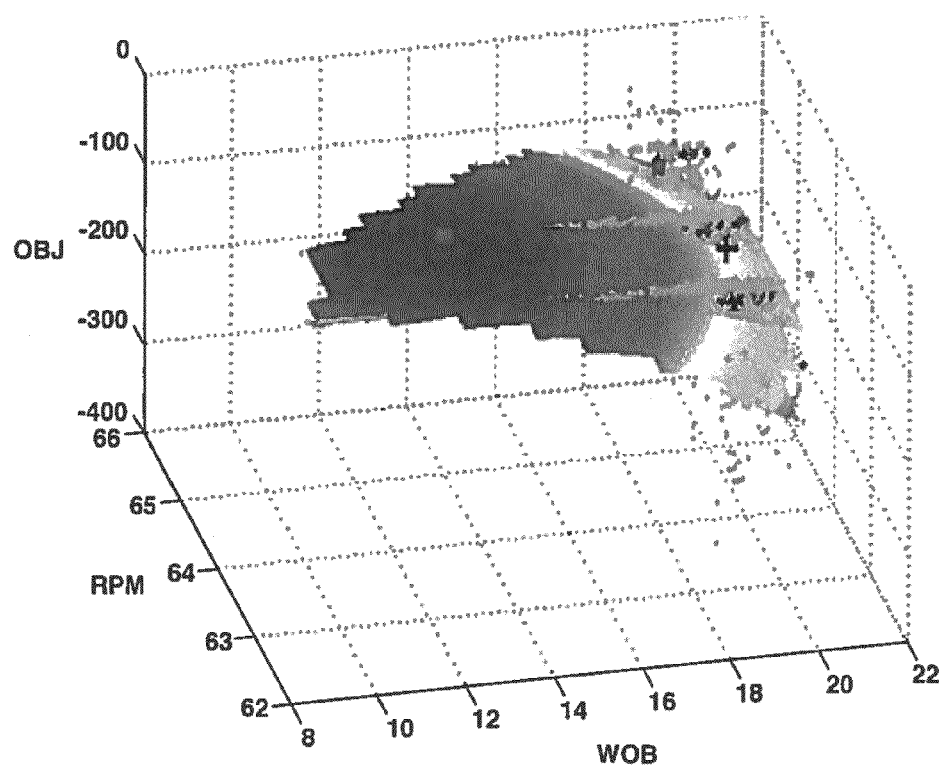
FIG. 6 shows the global search result with a constructed response surface from field data.

One of the embodiments of the response-surface based method includes the following steps: (1) collecting the real-time data into a moving window, (2) interpolating the response surface (the objective function as a function of at least two drilling controllable parameters) from the data, and (3) find an optimal point from the response surface. The response surface may be constructed by a regression analysis method such as least squares regression, or any interpolation method including quadratic interpolation, higher order polynomial interpolation, Delaunary triangulation, etc. FIG. 6 illustrates one example of the response surface of negative MSE as a function of WOB and RPM via a quadratic regression method. For real-time implementation, an FIFO (First-In-First-Out) buffer can be used to collect live data, and the response surface can be updated for each time update. With the constructed surface, the optimal point can be found immediately. However, the effectiveness of the global engine also depends on the input data variety.

The other type of global search engine does not require building the response surface. One of the embodiments is called "driller's method" which is similar to the traditional "drill-off test". The relevant parameters may be RPM and WOB, but without limitation other parameters may also be included such as mud pump rate, standpipe pressure, etc. In this exemplary method, the operating parameter space is provided by consideration of the maximum available WOB, the rig rotary speed limitations, minimum RPM for hole cleaning, as well as any other operational factors to be considered by the drilling organization, whether deemed as performance limitations, bit limitations, rig limitations, or any other factors. The maximum and minimum WOB and RPM are thus provided but could be subject to change for a subsequent drilling interval. The driller's method does not need any hyper-dimensional regression or interpolation method.

Figure 7:
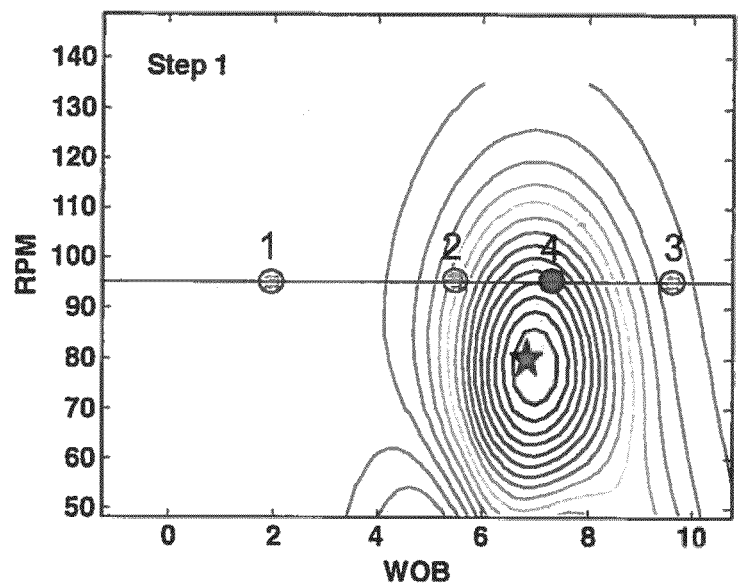
FIG. 7 illustrates the first step in a grid search using the Driller's Method, holding RPM constant and varying WOB.
Figure 8:
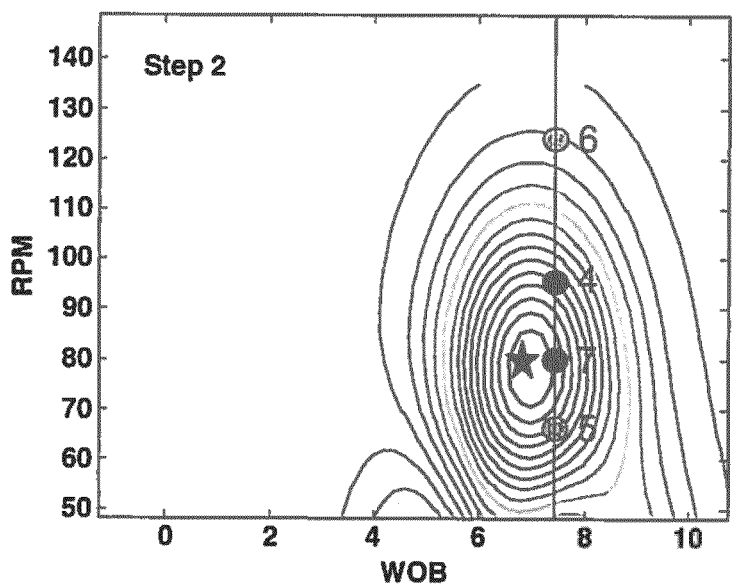
FIG. 8 illustrates the second step in a grid search using the Driller's Method, holding WOB constant and varying RPM.

FIGS. 7 and 8 illustrate how to implement the driller's method. In FIG. 7, Step 1 shows that the driller commences drilling with an operational parameter set 1. This operating condition is maintained just long enough to establish a consistent value for a selected objective function, such as those identified in Equations (1-5). For example, the MSE (Mechanical Specific Energy) may be a good selection for an objective function, which is shown by contour lines on FIGS. 7 and 8.

In Step 1 (FIG. 7), after sampling the drilling at parameter set 1 for an appropriate time interval (say two to five minutes, for example), the WOB may be increased at the same RPM to parameter set 2. After drilling a suitable amount of time at this condition, the WOB is then changed to parameter set 3. With drilling results and corresponding objective function values at three parameter sets, a polynomial curve fit, or some other function, may then be calculated. The optimum value of WOB, for fixed RPM, may then be calculated as parameter set 4. Alternative embodiments, with fewer or greater numbers of sample parameter sets, may also be chosen. Also, Step 1 may be chosen with fixed WOB and variable RPM, or alternatively, both may be varied simultaneously, requiring fitting the data to a two-dimensional surface. One embodiment of simultaneously alternating RPM and WOB values may be based on a Fractional Factorial test of Designs of Experiments (DOE). More generally, if there are N operating parameters to be optimized, the data may be fit to a surface of dimension up to N. Other implementations for processing a defined grid of operating parameter values may be conceived without departing from the scope of the invention.

Continuing with the Driller's Method, Step 2 as shown in FIG. 8 comprises holding the WOB at the value obtained for parameter set 4, which was found to be the optimal WOB at the initial value for RPM based on a curve fitting method. (In other embodiments, this step may not be required, and the optimal WOB may be used directly for different RPM values.) After drilling at parameter set 4 for some period of time, the RPM may be reduced for parameter set 5 and then increased for parameter set 6, for example. As before, with drilling results and corresponding objective function values at three parameter sets, a polynomial curve fit, or some other function, may then be calculated to identify the optimal RPM at this particular WOB. The parameter set 7 identified by the green dot is so obtained. In this example, the parameter set 7 is close to the theoretical optimal value identified by the red star in this chart.

There are many ways to conduct a global search. General methods for a global grid search are well known in the art, such as the Simplex, Golden Search, and Design of Experiments (DOE) methods. Several of these are provided in the reference, "Numerical Recipes in C," by W. H. Press et al.

Combined Methods for "Data Fusion"

After obtaining results for the global and local search engines, the next key step is how to combine the recommendations from the two engines. One of the embodiments is to use a data fusion method to dynamically combine the search results from the two engines. "Data fusion" is a relatively new term used to describe a broad set of analytical methods. An exemplary reference is "An Introduction to Multisensor Data Fusion," by Hall and Llinas, Proceedings of the IEEE, Vol. 85, No. 1, January 1997.

Figure 9:
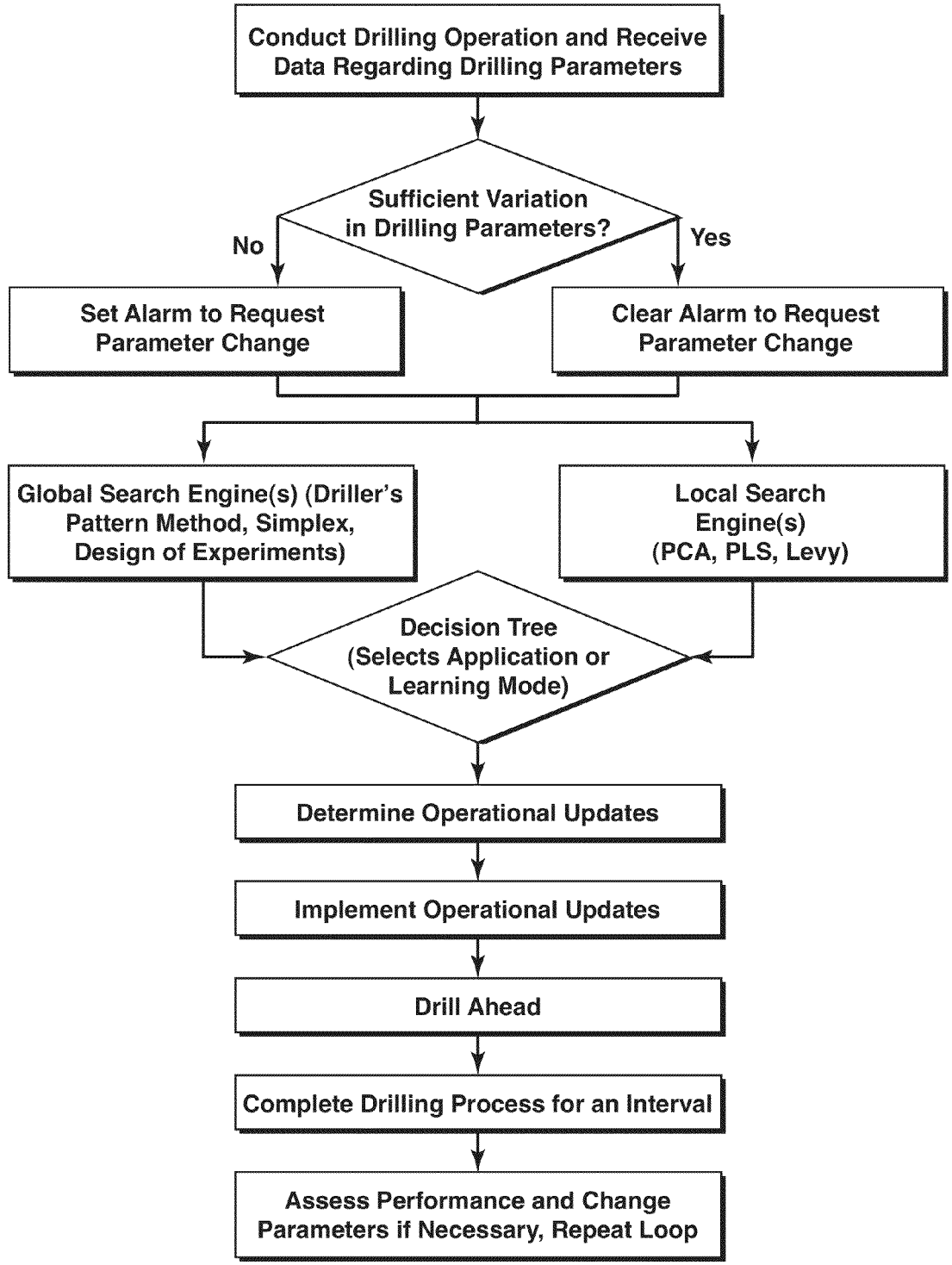
FIG. 9 is a flow chart of a drilling advisory system combining a local search engine and a global search engine for generating operational recommendations using a decision tree.

FIG. 9 is a flow diagram of the improved drilling advisory system (DAS) method. While drilling, the system is receiving data regarding the drilling parameters. A process is constantly checking the drilling parameters to determine if there is sufficient variation in the parameters for statistical validity. In one non-limiting approach, a count-down timer may be running on an ongoing basis. The timer starts to count down from the most recent change in parameters detected by the system. If no parameter is subsequently changed over a period of time (for example, 15 minutes) or depth, an alarm will be triggered and communicated to the driller via a visual indicator on the computer screen and/or an audio signal to remind the driller to change at least one drilling parameter. The timer is reset whenever a change is detected in one of the controllable parameters beyond some threshold amount. This step ensures that the drilling advisory system is fully utilized, because both global and local engines do not function well if there is no parameter change in the windowed dataset.

The local and global search engines may run in parallel and/or in serial mode. Key factors that contribute to selecting an engine include the history of knowledge of the drilling operations; detection of a significant change in the drilling process; specific time or depth trigger points; identification of a drilling dysfunction of the drilling process; an increase in a fundamental metric of the process, such as an increase in the MSE or a vibration score that may depend on an adjusted MSE value; or at the direction of the driller based on his or her specific knowledge of the drilling process and the present status of the operation. Statistical tests of the search results may also be used to assess statistical validity using a decision tree. If the tests are passed, then an application mode displays the results of data fusion of global and local search results. If the tests fail, then a learning mode may be activated indicating that more data is needed to increase the statistical validity of the calculations. In this learning mode, the methods used for the global and local search as well as data fusion could be different from the application mode. The objective of the learning mode is to provide guidance on how to change parameters to obtain sufficient data to pass the tests of statistical validity.

The count-down timer is a simple method to ensure sufficient variation in drilling parameters to achieve statistically significant results. Alternatively, the windowed dataset may be evaluated directly to determine if it is statistically significant. In general, to optimize a system dependent on N parameters, there must be a minimum of N+1 parameter sets within the data window to evaluate the process.

First, the combined method enables the driller to initiate the drilling optimization process by quickly scanning the operating parameter space. The data window is quickly filled with a variety of operating conditions, and the objective function map is coarsely sampled.

Second, when the objective function is subject to significant change, for example when the drill bit encounters a substantially different formation, the data window becomes stale and may be discarded. The grid search method then allows the data window to be refilled with drilling data observed in the new formation, and the statistics-based methods may be restarted. From a driller's perspective, the automated system no longer has relevant data, and the combined method recognizes this fact.

Third, every so often, to ensure that the objective function map has not changed significantly without detection, a global search engine can be quickly performed and the local search engine subsequently restarted or continued with fresh data from a broader set of operating parameters.

The two approaches work together to provide a system and associated methods that can be used under a wide variety of operating conditions. The global search provides some measure of protection against being stuck in a local optimum, since it is capable of spanning the entire operating parameter space. The local search engine is then well-suited to searching with smaller step sizes to optimize the objective function in a local sense.

In the event that there is a significant change in the objective function, or after a suitably long duration of time or depth without changes in drilling parameters, the grid search method may then be repeated, with the same or different trial operating parameter sets. It may be determined that the DAS data window should be flushed and restarted, but one option would be to continue to supplement the current data window with the new grid search results and any subsequent drilling data. These combined grid and statistics-based methods provide a robust drilling advisory system and methods. For change detection, various methods are available to identify a state change between different observation data sets, including statistical mean differences, clustering methods (K-means, minimax), edge detection methods (Gaussian filtering, Canny filtering, Hough Transform, etc.), STA/LTA (short-term average divided by long-term average), Kalman filtering, state observers, Bayesian Changepoint Detection (ref: Adams and MacKay), and other numerical techniques.

Decision Tree Methods

In one respect, a decision tree method may be used to determine if the results of the data fusion recommendations are satisfactory, or if the system should switch to a learning mode based recommendation. A statistical test may not pass a threshold, or some other trigger (such as bit-balling detection) may cause the decision tree method to choose a different path. Additionally or alternatively, there is a certain amount of knowledge about the drilling condition that may be considered in a decision tree approach. In addition, a drilling dysfunction map may be a useful tool in a decision tree method.

Figure 10:
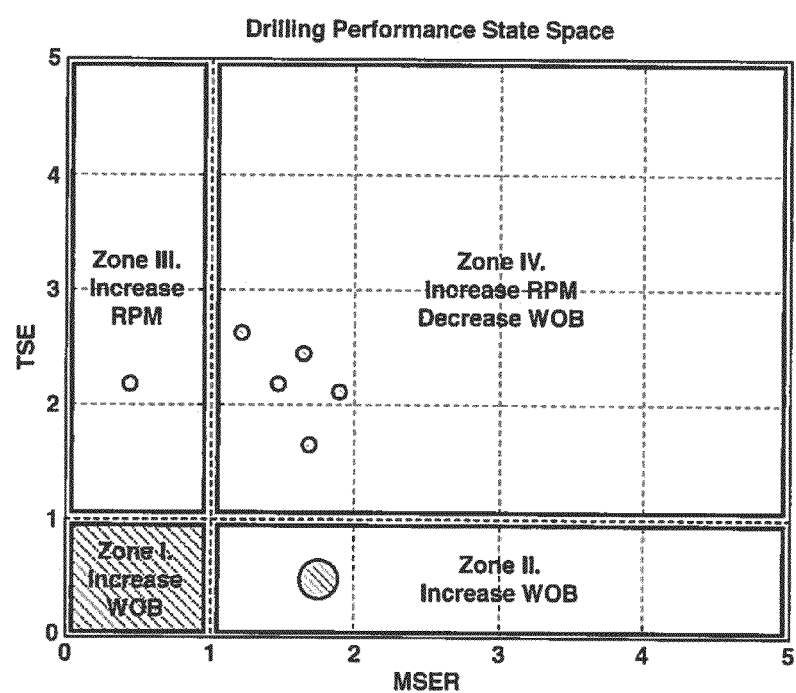
FIG. 10 is an exemplary drilling dysfunction map with four zones that may be used by a decision tree method to generate operational recommendations.

As shown in FIG. 10, a Drilling Performance State Space can be created by cross-plotting MSER and TSE. This may be accomplished on a 2-D chart in real time. The MSER ("MSE Ratio") is a normalized MSE value that is adjusted for depth, well profile, and formation effects. This allows different drilling conditions to have similar values for MSER, whereas we typically find lower values for an unnormalized MSE in softer formations and higher MSE values in harder rock. The MSER is described more fully in "Drilling Vibration Scoring System," U.S. Provisional Application No. 61/531,918, incorporated herein in its entirety. TSE ("Torsional Severity Estimate") is the ratio of the current bit rotary speed fluctuations to the corresponding rotary speed oscillations at full stick-slip conditions. The TSE is described more fully in U.S. Pat. No. 8,977,523 ("Methods To Estimate Downhole Drilling Vibration Amplitude From Surface Measurement") and U.S. Pat. No. 8,798,978 ("Methods To Estimate Downhole Drilling Vibration Indices From Surface Measurement"), incorporated herein in their entirety. At full stick-slip, the bit typically comes to a full stop and then accelerates to two times the nominal rotary speed, reflecting a sinusoidal oscillation about the nominal RPM.

The illustrated chart in FIG. 10 contains four zones: Zone I for good state with no perceived dysfunctions, Zone II for whirl state, Zone III for stick-slip state, Zone IV for whirl and stick-slip coupled state. The purpose of using this tool is to identify the current drilling performance state. Then we can generate recommendations for parameter changes by checking the lookup table in order to move the current drilling state towards a better condition, preferably Zone I, or to push the current operation limits if it currently has no dysfunction and is already in Zone I. This dysfunction map can be used by the decision tree method to guide learning mode recommendations, for example.

Figure 11:
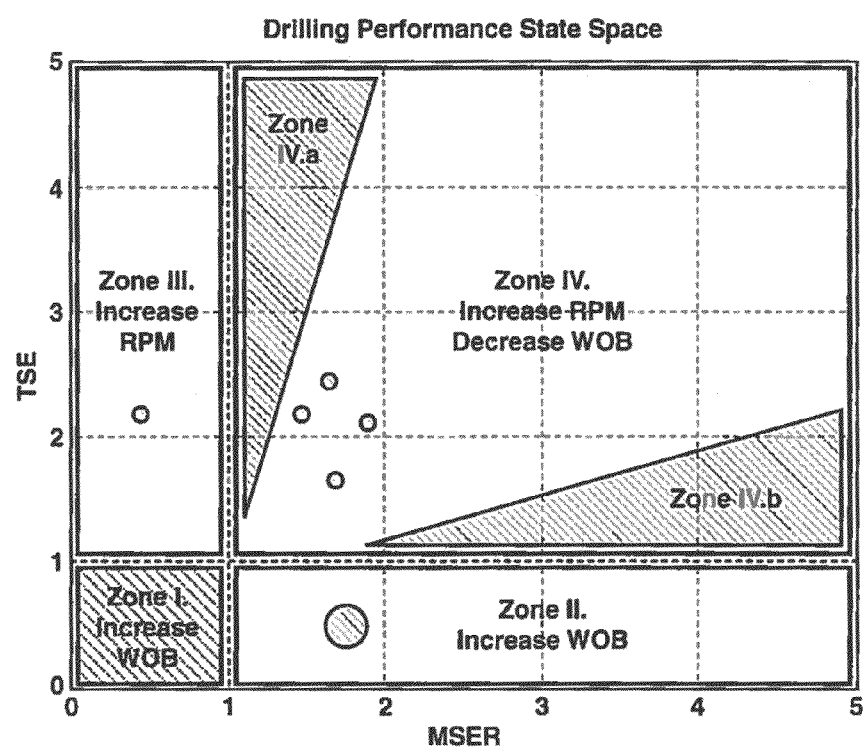
FIG. 11 is an alternative exemplary drilling dysfunction map with six zones that may be used by a decision tree method to generate operational recommendations.

A drilling performance state space may be divided into more than four zones. For example, in FIG. 11 we present a performance state space consisting of six state zones, and two sub-zones which are split from the coupled whirl-stick-slip zone IV of FIG. 10. For example, Zone IV.a is a coupled whirl-stick-slip zone in which stick-slip is dominant. On the other hand, Zone IV.b is coupled but whirl-dominant. Note that the size of the sub-zones, as indicated in FIG. 11, is for illustration only and is not limiting. Other zone partitioning of the drilling dysfunction map may be used, either larger or smaller, as necessary.

The critical values between zones may depend on certain drilling conditions, and it is not expected that the boundaries are particularly fixed. Generally, TSE=1 and MSER=1 may be used as critical values to separate between good and stick-slip zones along the MSER axis, and good and whirl-dominant zones along the TSE axis.

The axes of the drilling performance state space are not limited to MSER or TSE. Other embodiments of the axes can be at least any of the two normalized drilling state variables: axial vibrations, equivalent circulation density (ECD), etc. These drilling state variables may be normalized by using similar approaches for computing MSER. Furthermore, this method may be performed with a single state space variable, say MSER for example, or alternatively, the method may use three or more states, with appropriate adjustments to figures and calculations. Finally, the system may have a learning mode or element, which may include an algorithm, in which the system may detect the drilling dysfunction and can optimize to select the best value for the boundary parameter(s) using an approach based on optimization of an objective function.

For each zone on the drilling performance state space, the recommendations for WOB and RPM can be generated from guidelines, as shown in exemplary Table 1, a knowledge-based recommendation table. The recommendation table may provide the polarity on how to change drilling parameters (i.e. increase, decrease and hold). In some cases, the table may not provide the actual value. In this case, the step size for parameter changes may be selected in advance or calculated in consideration of the data fusion results to generate recommended values for drilling parameter changes.

TABLE 1

Knowledge based Recommendation Table

| Zone | Drilling Performance State | Recommendation |
|---|---|---|
| I | Good, no dysfunction | Increase WOB (primary) |
|  |  | Increase RPM (secondary) |
| II | Whirl dominant | Increase WOB (primary) |
|  |  | Reduce RPM (secondary) |
| III | Stick-slip dominant | Increase RPM (primary) |
|  |  | Reduce WOB (secondary) |
| IV | Whirl Stick-slip Coupled | Increase RPM (primary) |
|  |  | Reduce WOB (secondary) |
| IV.a | Whirl Stick-slip Coupled but Stick-slip dominant | Increase RPM (primary) Reduce WOB (secondary) |
| IV.b | Whirl Stick-slip Coupled but Whirl dominant | Increase WOB (primary) Reduce RPM (secondary) |

Illustrative, non-exclusive examples of systems and methods according to the present disclosure are presented in the following. It is within the scope of the present disclosure that the individual steps of the methods recited herein may additionally or alternatively be referred to as a "step for" performing the recited action.

"Decision Tree" Method and System Sample Applications

In the first example, after 80 minutes of drilling, the results of the global regression pass a statistical quality test for a minimum number of data points within a defined neighborhood of the optimum MSE objective function value on the response surface. Based on this statistical test, a decision tree activates an application mode and displays the drilling parameters corresponding to the response surface optimum, which are a WOB of 9,000 pounds and an RPM of 130. After an additional 20 minutes of drilling, there is no longer a sufficient amount of data points within a defined neighborhood of the optimum global response surface to meet a statistical quality test, and the decision tree activates a learning mode, which indicates to the driller that more data is needed to produce a valid recommendation, and the response surface results of WOB of 11,000 pounds and RPM of 120 are displayed to indicate where useful additional data may be obtained.

In a second example, a threshold for stick-slip severity is exceeded after 120 minutes of drilling, and a decision tree activates a learning mode that displays a recommendation of picking up off-bottom. In the moving 60-minute window of data, the results of the global and local search engines pass the statistical quality tests, but exceeding a stick-slip severity threshold overrides the statistical quality criteria in a decision tree, and a learning mode with a recommendation of picking up off-bottom is activated.

Figure 12:
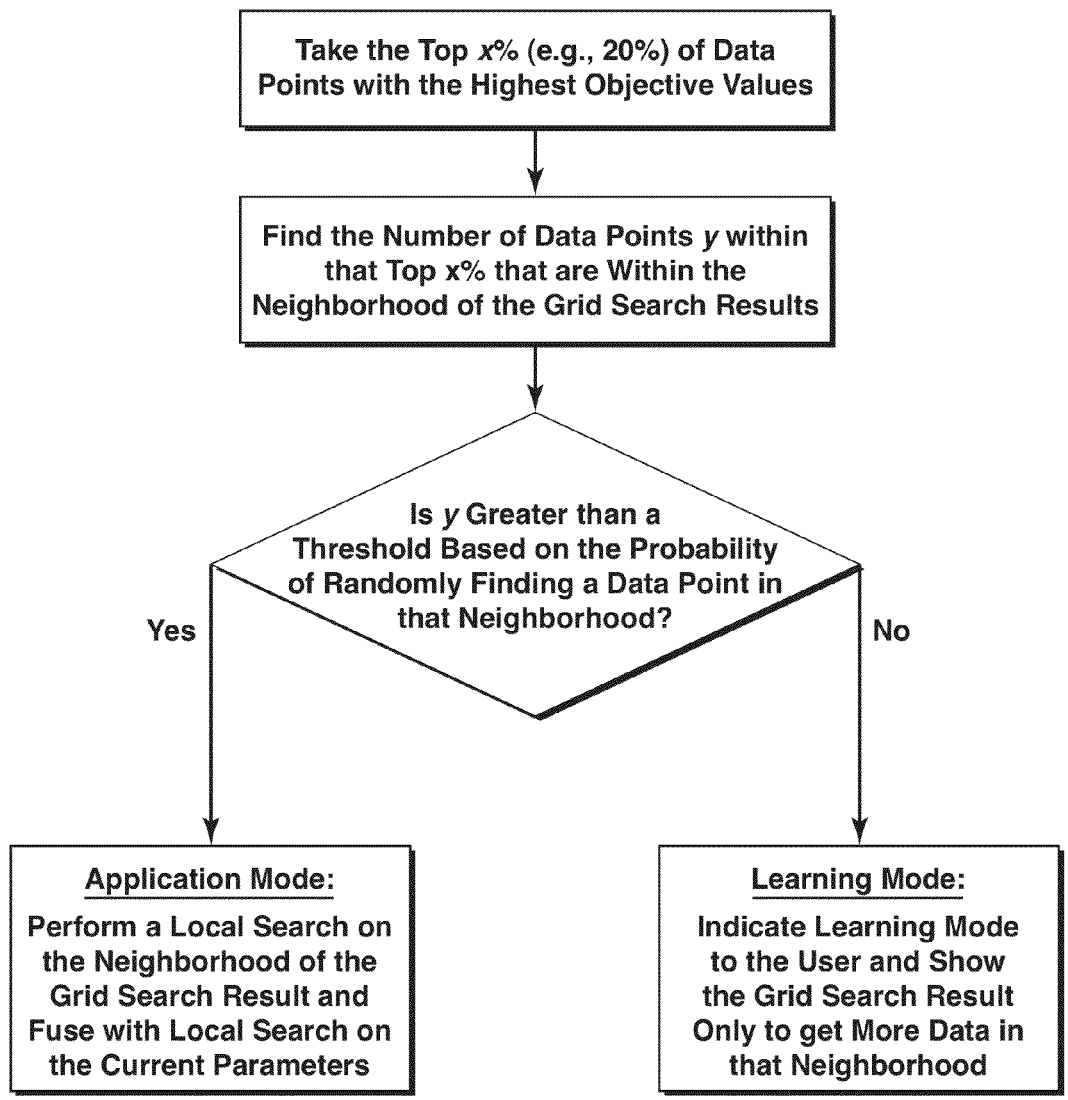
FIG. 12 is a flow chart showing an example of a decision tree for selecting between an application mode and a learning mode.

In the third example, the decision tree shown in FIG. 12 is used to select between an application mode and a learning mode. Out of a 40 minute data window, the top 20% of the data points with the highest object values are considered by the decision tree. There are 300 data points in that top 20%, but only 10 of them are in the neighborhood of the global search results, which is defined as within 3,000 pounds WOB and 15 RPM of the global search engine result of WOB of 12,000 pounds and RPM of 140. The probability of randomly finding a data point in that neighborhood is 10%, so there should have been at least 30 data points based on that probability. Since there were only 10 data points and that number is less than the threshold of 30 data points, the learning mode is activated to indicate to the driller that more data is needed. The global search engine result of WOB of 12,000 pounds and RPM of 140 is displayed to indicate where obtaining more data is likely to improve the statistical quality of the global search engine.

Figure 13:
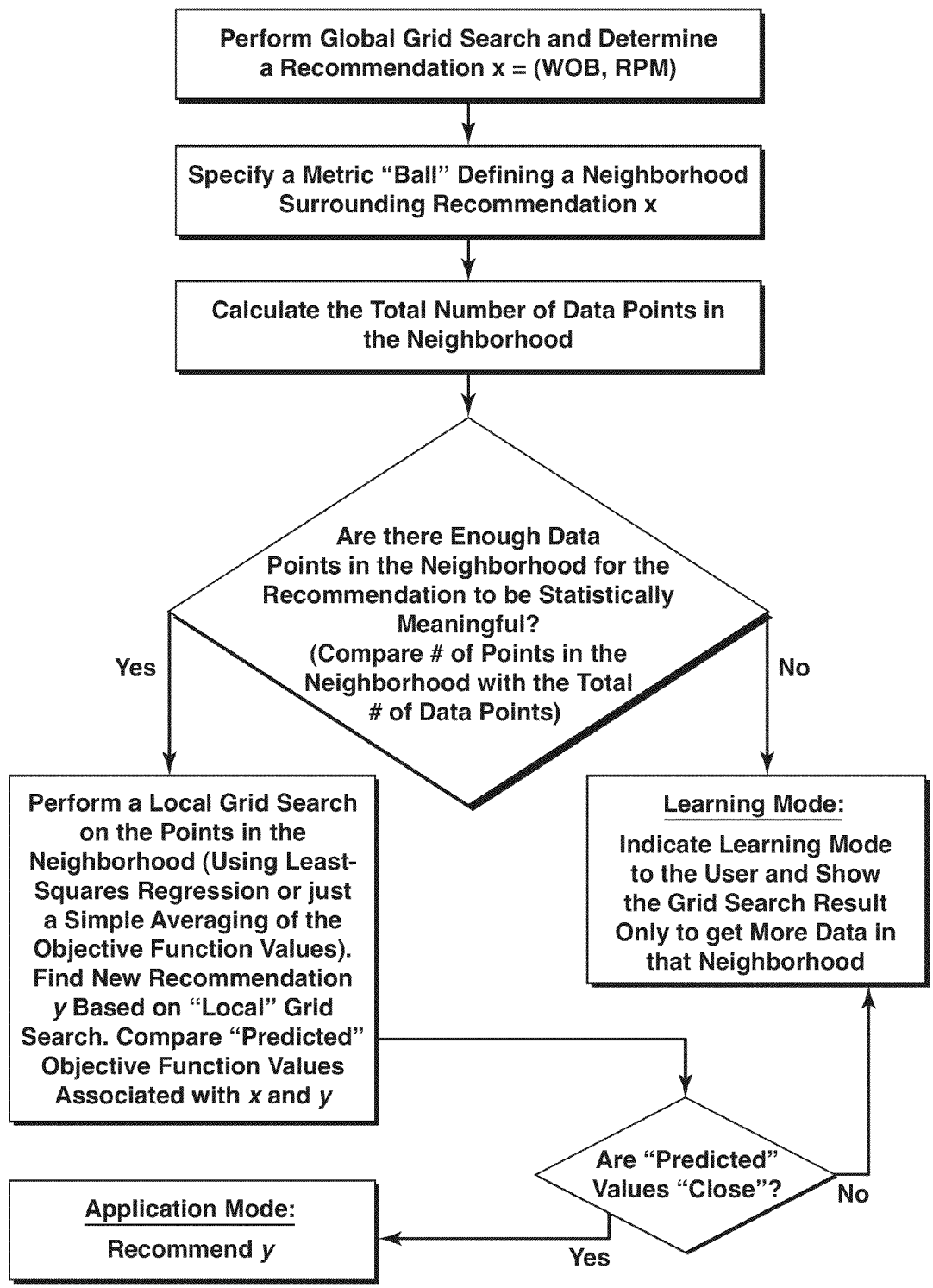
FIG. 13 is a flow chart showing a second example of a decision tree for selecting between an application mode and a learning mode.

In the fourth example, the decision tree shown in FIG. 13 is used to select between an application mode and a learning mode. The data window for this example is taken as 60 minutes. At an instance in time the global search engine is run using MSE as the objective function with a response surface generated using a generalized cubic least-squares fit of the acceptable data associated with the temporal data window. From the global search engine a recommendation x consisting of a WOB of 15,000 pounds and an RPM of 120 is obtained. A neighborhood is defined about the global search engine recommendation x as the region of points where WOB is between 13,000 and 17,000 and RPM is between 110 and 130. The decision tree is next activated to determine whether an application mode or a learning mode will be invoked. To this end, the number of data points collected which are contained within the defined neighborhood is found to be 50, which for this example is deemed a sufficient number to be considered statistically meaningful. As a result, the decision tree activates a "local grid search" which in this example consists of running the global search engine on only the 50 points associated with the defined neighborhood surrounding x. The "local grid search" produces recommendation y consisting of a WOB of 15,500 pounds and an RPM of 117. The response surface predictions for the objective function associated with x (based on the analysis using the full parameter space) and y (based on the analysis using the 50 points in the defined neighborhood only) are found to be similar. As a result, the decision tree is invoked to display the recommended "local grid search" result y consisting of a WOB of 15,500 pounds and an RPM of 117.

Figure 14:
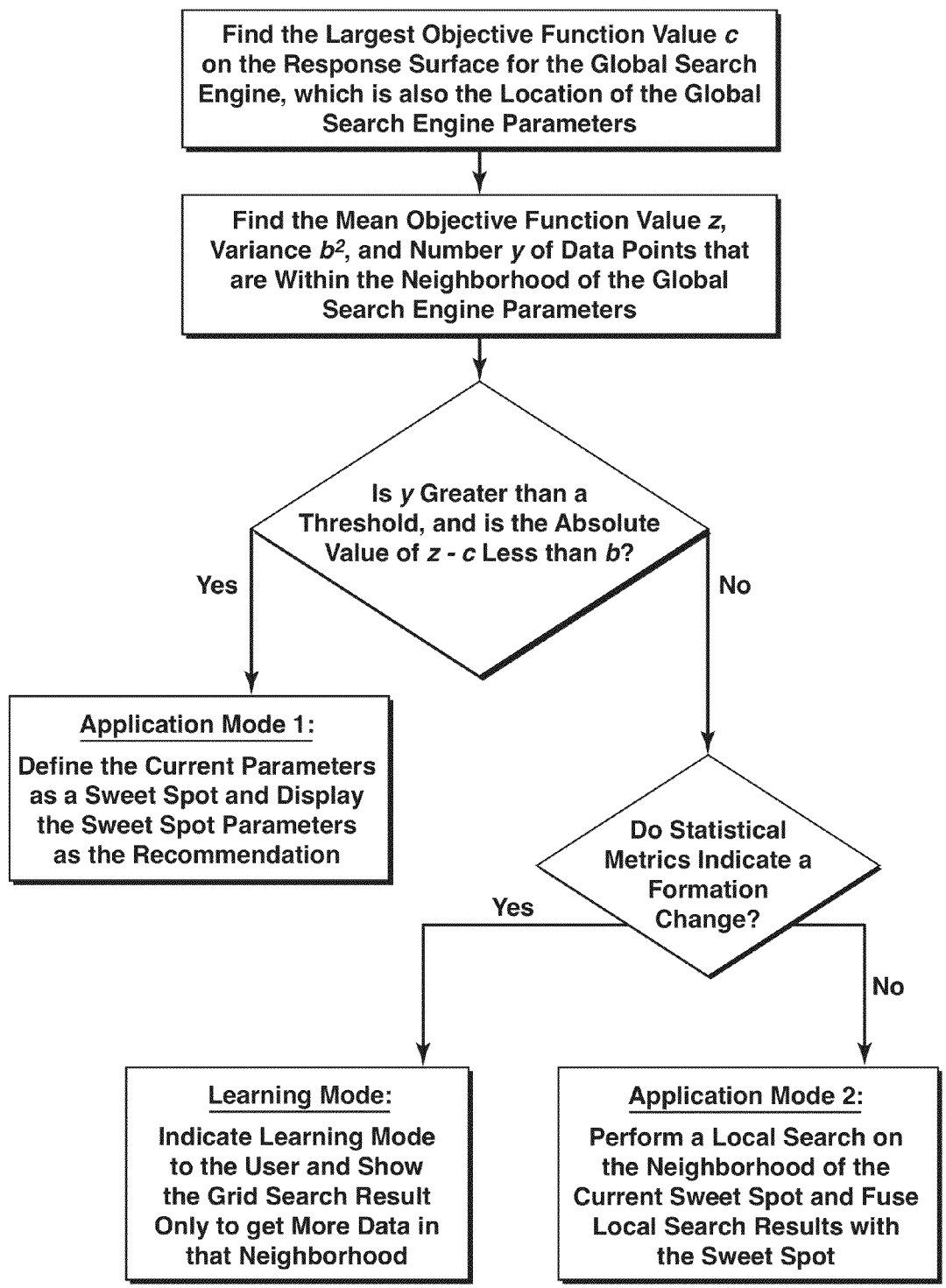
FIG. 14 is a flow chart showing a third example of a decision tree for selecting between two application modes and a learning mode.

In the fifth example, the decision tree shown in FIG. 14 is used to select between two application modes and a learning mode. The test for the statistical quality of the response surface for the global search engine is whether the optimum objective function value is sufficiently close to the mean of the data points that are within the neighborhood of the objective function value. The largest objective function value on the response surface is −30 ksi MSE, and the corresponding parameters are 20,000 pounds WOB and 170 RPM. There are 42 data points within 3,000 pounds WOB and 15 RPM of this global response surface optimum, and the mean of these data points in −40 ksi. The square root of the variance of these 42 data points in 12 ksi. The threshold for application mode 1 is set at 30 data points, and so the statistical test is passed because absolute value of the difference between −30 ksi and −40 ksi is less than 12 ksi. Application mode 1 is activated, and the current global response surface parameters are defined as sweet spot parameters. Five seconds later, the new windowed dataset fails the statistical quality test of the response surface, and statistical metrics do not indicate a formation change. Application mode 2 is activated, and local search engine results are fused with the current sweet spot. Five minutes later, the statistical quality test is failed, and a formation change is detected by a statistical test. In the test, the difference between the current mean of the data points within the neighborhood of the sweet spot and the previous mean is more than a tolerance of 30 ksi. The learning mode is then activated to indicate that more data is needed to characterize drilling performance in the new formation.

The systems and methods described herein are applicable to the oil and gas industry, especially to the wellbore drilling aspects of such industry.

In the present disclosure, several of the illustrative, non-exclusive examples of methods have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently. It is within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B", when used in conjunction with open-ended language such as "comprising" can refer, in one embodiment, to A only (optionally including entities, other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" may mean A alone, B alone, C alone, A and B together, A and C together, B and C together, A, B and C together, and optionally any of the above in combination with at least one other entity.

In some aspects, the improvements according to this disclosure and claims may include but are not limited to:

A method of drilling a wellbore through subterranean formation, the method comprising: receiving data regarding at least two drilling operational parameters related to wellbore drilling operations; running a global search engine to optimize at least two controllable drilling parameter values and separately running a local search engine to optimize the at least two controllable drilling parameter values, each optimization based on at least one objective function; determining a further optimized recommendation for the at least two controllable drilling parameters based upon the optimized results of the global and local search engines; using decision trees to select between an application mode of generating a still further optimized recommendation for the optimized at least two controllable drilling parameter values and a learning mode of generating a still further optimized recommendation for the optimized at least two controllable drilling parameter values; using the selected application mode to determine an operational updates to at least one of the at least two controllable drilling parameters based at least in part on the still further optimized recommendation; and implementing at least one of the determined operational updates in the wellbore drilling operations.

The method of according to any of the preceding paragraphs, wherein the drilling operational parameters include at least one of weight on bit (WOB), drillstring rotary speed, drillstring torque, rate of penetration (ROP), drilling fluid flow rate, stand pipe pressure, differential pressure across a mud motor, depth-of-cut (DOC), bit friction coefficient mu, and mechanical specific energy (MSE).

The method of according to any of the preceding paragraphs, wherein the at least two controllable drilling parameter values include WOB, RPM, drilling fluid flow rate, and pump stroke rate.

The method of according to any of the preceding paragraphs, wherein the received data is temporarily accumulated in a moving memory window, and wherein the global and local search engines use data from at least a portion of the moving memory window.

The method of according to any of the preceding paragraphs, wherein the moving memory window accumulates data in an interval based on at least one of time and depth; and wherein the length of the window is determined by the frequency of changing the controllable drilling parameters and lithology changes.

The method of according to any of the preceding paragraphs, wherein the global search engines are based on grid search methods comprising at least one of: 9-point, simplex, golden search, design of experiments (DOE) methods.

The method of according to any of the preceding paragraphs, wherein the grid search method comprises: (1) calculating an objective function from recorded data related to the at least two drilling operational parameters; (2) constructing a response surface by regression or interpolation methods from the objective function values, using at least one of least squares regression, quadratic interpolation or Delaunay triangulation; (3) finding an optimum value for the objective function from the response surface; (4) determining the optimized controllable drilling parameter values associated with the optimum value of the response surface.

The method of according to any of the preceding paragraphs, wherein the objective function is based on at least one of: rate of penetration (ROP), depth of cut (DOC), mechanical specific energy (MSE), weight on bit (WOB), drillstring rotation rate, bit coefficient of friction (mu), bit rotation rate, torque applied to the drillstring, torque applied to the bit, vibration measurements, hydraulic horsepower, and mathematical combinations thereof.

The method of according to any of the preceding paragraphs, wherein the local search engines are based on principal component analysis (PCA), Powell's method, gradient search, or other search methods.

The method of according to any of the preceding paragraphs, wherein a decision tree based on statistical quality metrics is used to select from application and learning modes to generate operational recommendations.

The method of according to any of the preceding paragraphs, wherein a decision tree based on at least one drilling dysfunction map is used to select from application and learning modes to generate operational recommendations.

The method of according to any of the preceding paragraphs, wherein a decision tree based on a combination of statistical quality metrics and at least one drilling dysfunction map is used to select from application and learning modes to generate operational recommendations.

The method of according to any of the preceding paragraphs, wherein the decision tree selects a learning mode and empties the data window, continues to receive drilling parameter data, recommends controllable drilling parameter values to the driller, and calculates the statistical quality metrics of the collected data.

The method of according to any of the preceding paragraphs, wherein an application mode indicates that the collected data is of sufficient quality to make recommendations. The recommendations are generated via at least one of the following methods: a local search engine, a global search engine, and a data fusion method that combines the recommendations from local and global search engines.

The method of according to any of the preceding paragraphs, wherein determining operational updates is implemented by processing the operational recommendations with consideration of the drilling conditions and includes at least one of the following: (1) increase the controllable drilling parameter(s); (2) reduce the controllable drilling parameter(s); (3) maintain the current drilling parameter(s); (4) pick up off bottom.

The method of according to any of the preceding paragraphs, further comprising conducting at least one hydrocarbon production-related operation in the wellbore; wherein the at least one hydrocarbon production-related operation is selected from the group comprising: injection operations, treatment operations, and production operations.

The method of according to any of the preceding paragraphs, wherein at least one of the determined operational recommendations is implemented in the drilling operation substantially automatically.

The method of according to any of the preceding paragraphs, further comprising a count-down timer for changing at least one of the controllable drilling parameters.

The method of according to any of the preceding paragraphs, wherein the step of determining a further optimized recommendation for the at least two controllable drilling parameters based upon the optimized results of the global and local search engines further comprises using a data fusion method.

A computer-based system for use in association with drilling operations, the computer-based system comprising: a processor adapted to execute instructions; a storage medium in communication with the processor; and at least one instruction set accessible by the processor and saved in the storage medium; wherein the at least one instruction set is adapted to: receiving data regarding at least two drilling operational parameters related to wellbore drilling operations; running a global search engine to optimize at least two controllable drilling parameter values and separately running a local search engine to optimize the at least two controllable drilling parameter values, each optimization based on at least one objective function; determining a further optimized recommendation for the at least two controllable drilling parameters based upon the optimized results of the global and local search engines; using decision trees to select between an application mode of generating a still further optimized recommendation for the optimized at least two controllable drilling parameter values and a learning mode of generating a still further optimized recommendation for the optimized at least two controllable drilling parameter values; using the selected application mode to determine an operational updates to at least one of the at least two controllable drilling parameters based at least in part on the still further optimized recommendation; and exporting the determined operational updates to an output device for use in ongoing drilling operations.

The system of according to any of the preceding paragraphs, wherein the determined operational updates are exported to a network such that the determined operational updates could be read from other local computers at the rig and/or remote computers from other locations.

The system of according to any of the preceding paragraphs, wherein the determined operational updates are exported to a control system adapted to implement substantially automatically at least one of the implemented at least one of the determined operational recommendations during the drilling operation.

The system of according to any of the preceding paragraphs, wherein the output device comprises at least one of another processor, a printer, a computer network, and a graphical display device.

The system of according to any of the preceding paragraphs, wherein the step of determining a further optimized recommendation for the at least two controllable drilling parameters based upon the optimized results of the global and local search engines further comprises using a data fusion method.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and sub-combinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and sub-combinations that are directed to one of the disclosed inventions and are novel and non-obvious. Inventions embodied in other combinations and sub-combinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

While the present techniques of the invention may be susceptible to various modifications and alternative forms, the exemplary embodiments discussed above have been shown by way of example. However, it should again be understood that the invention is not intended to be limited to the particular embodiments disclosed herein. Indeed, the present techniques of the invention are to cover all modifications, equivalents, and alternatives falling within the spirit and scope of the invention as defined by the following appended claims.

What is claimed is:

1. A method of drilling a wellbore through subterranean formation, the method comprising:
    (a) receiving data regarding at least two drilling operational parameters related to wellbore drilling operations into an operating parameter database;
    (b) computing a mathematical objective function based upon the received data for input into each of a global search engine and a local search engine;
    (c) inputting the computed objective function and received data into the global search engine to create a global response surface, and to identify at least two global-engine recommended drilling parameters;
    (d) inputting the computed objective function and received data into the local search engine to determine a significantly correlated drilling parameter, and to identify at least two local-engine recommended drilling parameters based upon the significantly correlated controllable drilling parameter;
    (e) creating a combined dataset using a data fusion process by combining (i) the created global response surface, and (ii) the determined significantly correlated controllable drilling parameter and the local-engine recommended drilling parameters;
    (f) using a decision tree process on the data fusion combined dataset to determine whether to define a status mode of the combined dataset as at least one of a learning mode and an application mode;
    (g) wherein if the decision tree status mode determination of step (f) is learning mode, then;

a. providing an additional data input for each of the at least two drilling operational parameters in the operating parameter database and repeating steps (b)-(f) for the additional data input for expanding the created global response surface and for revising the global-engine recommended drilling parameters; and b. recommending use of the global-engine recommended drilling parameters for making an implementable drilling operational decision; and (h) wherein if the decision tree status mode selection of step (f) is application mode, then comparing the global-engine recommended drilling parameters with the local-engine recommended drilling parameters;

a. wherein if the compared global-engine recommended drilling parameters and the local-engine recommended drilling parameters are determined to be correlated within a predefined range of agreement with each other, instructing to use either of the global-engine recommended or local-engine recommended set of correlated drilling parameters for use regarding drilling operations; and b. wherein if the two sets are determined not within a predefined range of agreement with each other, re-perform the local search engine on the global-engine recommended drilling parameters to identify updated local-engine recommended drilling parameters, and instructing to use the local-engine recommended set of correlated drilling parameters for use regarding drilling operations.

2. The method of claim 1, wherein the drilling operational parameters include at least one of weight on bit (WOB), drillstring rotary speed, drillstring torque, rate of penetration (ROP), drilling fluid flow rate, stand pipe pressure, differential pressure across a mud motor, depth-of-cut (DOC), bit friction coefficient mu, and mechanical specific energy (MSE).

3. The method of claim 1, wherein using the decision tree process on the data fusion combined dataset to determine whether to define the status mode of the combined dataset as at least one of the learning mode and the application mode further comprises the steps of:
determining whether an acceptable variation in drilling operational parameters exists within the global search engine response surface;
determining whether the drilling operations are occurring in the same formation as other data within the operating parameter database; and
determining whether the drilling operations are experiencing a drilling dysfunction.

4. The method of claim 1, wherein the received data is temporarily accumulated in a moving memory window as the operating parameter database, and wherein the global and local search engines use data from at least a portion of the moving memory window.

5. The method of claim 4, wherein the moving memory window accumulates data in an interval based on at least one of time and depth; and
wherein the length of the window is determined by a frequency of changing the controllable drilling parameters and by a lithology change.

6. The method of claim 1, wherein the global search engine is based on grid a search method comprising at least one of: 9-point, simplex, golden search, and design of experiments (DOE) methods.

7. The method of claim 1, wherein the global search engine is based on a grid search method comprising: (1) calculating an objective function from recorded data related to the at least two drilling operational parameters; (2) constructing a response surface by regression or interpolation methods from the objective function values, using at least one of least squares regression, quadratic interpolation or Delaunay triangulation; (3) finding an optimum value for the objective function from the response surface; and (4) determining the optimized controllable drilling parameter values associated with the optimum value of the response surface.

8. The method of claim 7, wherein the objective function is based on at least one of: rate of penetration (ROP), depth of cut (DOC), mechanical specific energy (MSE), weight on bit (WOB), drillstring rotation rate, bit coefficient of friction (mu), bit rotation rate, torque applied to the drillstring, torque applied to the bit, vibration measurements, hydraulic horsepower, and mathematical combinations thereof.

9. The method of claim 1, wherein the local search engine is based on at least one of principal component analysis (PCA), Powell's method, and gradient search.

10. The method of claim 1, wherein a decision tree based on statistical quality metrics is used to select from the application status mode and the learning status mode.

11. The method of claim 1, wherein a decision tree based on at least one drilling dysfunction map is used to select from the application status mode and the learning status mode.

12. The method of claim 1, wherein a decision tree based on a combination of statistical quality metrics and at least one drilling dysfunction map is used to select from the application status mode and the learning status mode to generate operational recommendations.

13. The method of claim 1, wherein the decision tree determines to define the status mode of the combined dataset as learning mode status and empties the data window, continues to receive drilling parameter data, recommends controllable drilling parameter values to a driller, and calculates a statistical quality metric of the received data.

14. The method of claim 1, further comprising conducting at least one hydrocarbon production-related operation in the wellbore; wherein the at least one hydrocarbon production-related operation is selected from the group comprising: injection operations, treatment operations, and production operations.

15. The method of claim 1, further comprising a countdown timer for changing at least one of the at least two drilling operational parameters.

16. A computer-based system for use in association with drilling operations, the computer-based system comprising:
a processor adapted to received data and execute instructions;
a storage medium in communication with the processor; and
at least one instruction set accessible by the processor and saved in the storage medium;
wherein the at least one instruction set is adapted to:
(a) receiving data regarding at least two drilling operational parameters related to wellbore drilling operations into an operating parameter database;
(b) computing a mathematical objective function based upon the received data for input into each of a global search engine and a local search engine;
(c) inputting the computed objective function and received data into the global search engine to create a global response surface, and to identify global-engine recommended drilling parameters;
(d) inputting the computed objective function and received data into the local search engine to determine a significantly correlated drilling parameter, and to identify a local-engine recommended drilling parameters based upon the significantly correlated controllable drilling parameter;

(e) creating a combined dataset using a data fusion process by combining (i) the created global response surface, and (ii) the determined significantly correlated controllable drilling parameter and the local-engine recommended drilling parameters;

(f) using a decision tree process on the data fusion combined dataset to determine whether to define a status mode of the combined dataset as at least one of a learning mode and an application mode;

(g) wherein if the decision tree status mode selection of step (f) is learning mode, then;
  a. providing an additional data input for each of the at least two drilling operational parameters in the operating parameter database and repeating steps (b)-(f) for the additional data input for expanding the created global response surface and for revising the global-engine recommended drilling parameters; and
  b. recommending use of the global-engine recommended drilling parameters for making an implementable drilling operational decision; and (h) wherein if the decision tree status mode selection of step (f) is application mode, then comparing the global-engine recommended drilling parameters with the local-engine recommended drilling parameters;
  a. wherein if the compared global-engine recommended drilling parameters and the local-engine recommended drilling parameters are determined to be correlated within a predefined range of agreement with each other, instructing to use either of the global-engine recommended or local-engine recommended set of correlated drilling parameters for use regarding drilling operations; and
  b. wherein if the two sets are determined not within a predefined range of agreement with each other, re-perform the local search engine on the global-engine recommended drilling parameters to identify updated local-engine recommended drilling parameters, and instructing to use either of the global-engine recommended or local-engine recommended set of correlated drilling parameters for use regarding drilling operations.

17. The computer-based system of claim 16, wherein the determined operational updates are exported to a network such that the determined operational updates could be read from other local computers at the rig and/or remote computers from other locations.

18. The computer-based system of claim 16, wherein the determined operational updates are exported to a control system adapted to implement substantially automatically at least one of the recommended use of the global-engine recommended drilling parameters and the local-engine recommended drilling parameters during the drilling operation.

19. The computer-based system of claim 16, wherein the output device comprises at least one of another processor, a printer, a computer network, and a graphical display device.

\* \* \* \* \*